(12) United States Patent
Umeda

(10) Patent No.: US 8,694,373 B2
(45) Date of Patent: Apr. 8, 2014

(54) METHODS AND SYSTEMS FOR PROCESSING AND DISPLAYING ADVERTISEMENTS OF VARIABLE LENGTHS

(75) Inventor: Shigeto Umeda, Palo Alto, CA (US)

(73) Assignee: Dennoo Inc., Palo Alto, CA (US)

( * ) Notice: Subject to any disclaimer, the term of this patent is extended or adjusted under 35 U.S.C. 154(b) by 119 days.

(21) Appl. No.: 13/324,325

(22) Filed: Dec. 13, 2011

(65) Prior Publication Data

US 2013/0066713 A1    Mar. 14, 2013

Related U.S. Application Data

(60) Provisional application No. 61/540,164, filed on Sep. 28, 2011, provisional application No. 61/568,594, filed on Dec. 8, 2011.

(30) Foreign Application Priority Data

Sep. 9, 2011   (JP) ................................. 2011-197718

(51) Int. Cl.
  *G06Q 30/00*   (2012.01)
  *G06Q 40/00*   (2012.01)
  *G06F 15/173*  (2006.01)

(52) U.S. Cl.
  USPC ................. 705/14.46; 705/14.69; 705/14.71; 705/14.73; 705/37; 709/224

(58) Field of Classification Search
  USPC ............... 705/14.46, 14.71, 14.73, 14.69, 37; 709/224
  See application file for complete search history.

(56) References Cited

U.S. PATENT DOCUMENTS

| | | |
|---|---|---|
| 6,279,036 B1 | 8/2001 | Himmel et al. |
| 7,647,609 B2 | 1/2010 | Wachtfogel et al. |
| 8,145,659 B1 | 3/2012 | Smith et al. |
| 2001/0056374 A1 | 12/2001 | Joao |

(Continued)

FOREIGN PATENT DOCUMENTS

| | | |
|---|---|---|
| JP | 11-134353 A | 5/1999 |
| JP | 2001-118006 A | 4/2001 |

(Continued)

OTHER PUBLICATIONS

Non-Final Office Action mailed Jul. 10, 2012, in co-pending U.S. Appl. No. 13/478,020, filed May 22, 2012.

(Continued)

*Primary Examiner* — Sun Li
(74) *Attorney, Agent, or Firm* — Perkins Coie LLP

(57) ABSTRACT

A cost-per-second (CPS) based technology for Internet advertising is introduced. In one embodiment, the systems and methods described herein improve efficiency and efficacy of Internet based advertisements. Efficiency is improved by making advertisements relevant to the user; decreasing loss or waste in advertisement space and opportunity for the publisher; and displaying advertisements only for an appropriate duration and being charged according to actual duration for the advertiser. In embodiments, the cost for a certain branding effect can be measured and used with higher accuracy. In embodiments where multiple advertisements are shown simultaneously or at various timings, the technology introduced here provides unique bidding models to allow an advertiser to bid for advertising space, of an advertisement display. The bidding models incorporate bidding based on CPS, a function of CPS and cost-plus-click, effective CPS, etc. Conversion models for comparing advertising schema using traditional and newly introduced models are also disclosed.

27 Claims, 18 Drawing Sheets

FIG 3C: Page View and Session Usage as Introduced Herein

(56) References Cited

U.S. PATENT DOCUMENTS

| | | | |
|---|---|---|---|
| 2002/0144262 | A1 | 10/2002 | Plotnick et al. |
| 2003/0177490 | A1 | 9/2003 | Hoshino et al. |
| 2005/0114198 | A1 | 5/2005 | Koningstein et al. |
| 2005/0120311 | A1 | 6/2005 | Thrall |
| 2006/0004628 | A1 | 1/2006 | Axe et al. |
| 2006/0041480 | A1* | 2/2006 | Briggs ............................ 705/14 |
| 2006/0259589 | A1 | 11/2006 | Lerman et al. |
| 2006/0287913 | A1 | 12/2006 | Baluja |
| 2007/0074253 | A1 | 3/2007 | Takai et al. |
| 2007/0078707 | A1 | 4/2007 | Axe et al. |
| 2007/0106555 | A1* | 5/2007 | Benson ............................ 705/14 |
| 2007/0169155 | A1 | 7/2007 | Pasquale et al. |
| 2007/0226058 | A1 | 9/2007 | Lorenzen et al. |
| 2007/0244750 | A1 | 10/2007 | Grannan et al. |
| 2008/0028064 | A1* | 1/2008 | Goyal et al. .................. 709/224 |
| 2008/0066107 | A1 | 3/2008 | Moonka et al. |
| 2008/0109300 | A1 | 5/2008 | Bason |
| 2008/0114639 | A1 | 5/2008 | Meek et al. |
| 2008/0114672 | A1 | 5/2008 | Yahia et al. |
| 2008/0163071 | A1 | 7/2008 | Abbott et al. |
| 2009/0012868 | A1 | 1/2009 | DeAngelis |
| 2009/0055268 | A1 | 2/2009 | Knoller et al. |
| 2009/0177537 | A1 | 7/2009 | Taylor et al. |
| 2009/0193458 | A1 | 7/2009 | Finseth et al. |
| 2009/0216621 | A1 | 8/2009 | Anderson et al. |
| 2009/0319372 | A1 | 12/2009 | Makeev |
| 2009/0327083 | A1 | 12/2009 | Mathew et al. |
| 2010/0057536 | A1 | 3/2010 | Stefik et al. |
| 2010/0057639 | A1* | 3/2010 | Schwarz et al. .............. 705/400 |
| 2010/0070350 | A1* | 3/2010 | Paunikar et al. ............. 705/14.1 |
| 2010/0114712 | A1 | 5/2010 | Masuda et al. |
| 2010/0122282 | A1 | 5/2010 | DuBose |
| 2010/0153544 | A1 | 6/2010 | Krassner et al. |
| 2010/0257553 | A1 | 10/2010 | Yuen et al. |
| 2010/0269030 | A1 | 10/2010 | Dugonjic et al. |
| 2010/0273553 | A1 | 10/2010 | Zalewski |
| 2011/0040611 | A1 | 2/2011 | Simmons et al. |
| 2011/0119595 | A1 | 5/2011 | Bydeley et al. |
| 2011/0125577 | A1 | 5/2011 | Song et al. |
| 2011/0137737 | A1 | 6/2011 | Baird et al. |
| 2011/0282742 | A1 | 11/2011 | Umeda |
| 2012/0130805 | A1 | 5/2012 | On et al. |
| 2012/0284111 | A1 | 11/2012 | Shi et al. |
| 2013/0060644 | A1 | 3/2013 | Le Ouay et al. |

FOREIGN PATENT DOCUMENTS

| | | | |
|---|---|---|---|
| JP | 2002-297993 | A | 10/2002 |
| JP | 3693938 | A | 9/2005 |
| JP | 2006-500700 | A | 1/2006 |
| JP | 2007-164710 | A | 6/2007 |
| JP | 2008-243161 | A | 10/2008 |
| JP | 2009-080733 | A | 4/2009 |
| JP | 2009-146235 | A | 7/2009 |
| JP | 2010-056751 | A | 3/2010 |
| KR | 10-2007-0038753 | A | 4/2007 |
| KR | 10-2008-0090583 | A | 10/2008 |
| KR | 10-2010-0040054 | A | 4/2010 |
| WO | WO-2006/051971 | A1 | 5/2006 |
| WO | WO-2011/142486 | A1 | 11/2011 |

OTHER PUBLICATIONS

Non-Final Office Action mailed Jul. 23, 2012, in co-pending U.S. Appl. No. 13/477,981, filed May 22, 2012.
U.S. Appl. No. 61/540,164, filed Sep. 28, 2011.
U.S. Appl. No. 61/568,594, filed Dec. 8, 2011.
U.S. Appl. No. 61/500,380, filed Feb. 17, 2012.
U.S. Appl. No. 61/615,834, filed Mar. 26, 2012.
U.S. Appl. No. 61/635,819, filed Apr. 19, 2012.
U.S. Appl. No. 61/699,143, filed Sep. 10, 2012.
Co-Pending U.S. Appl. No. 13/477,981, filed May 22, 2012.
Co-Pending U.S. Appl. No. 13/478,020, filed May 22, 2012.
Co-Pending U.S. Appl. No. 13/540,528, filed Jul. 2, 2012.
Co-Pending U.S. Appl. No. 13/540,538, filed Jul. 2, 2012.
Co-Pending U.S. Appl. No. 13/570,831, filed Aug. 9, 2012.
Co-Pending U.S. Appl. No. 13/605,915, filed Sep. 6, 2012.
Co-Pending U.S. Appl. No. 13/609,145, filed Sep. 10, 2012.
Goldstein, et al., "The Effects of Exposure Time on Memory of Display Advertisements", *EC'11*, Jun. 5-9, 2011, San Jose, CA.
U.S. Appl. No. 61/785,765, filed Mar. 14, 2013.
Final Office Action mailed Mar. 14, 2013, in Co-Pending U.S. Appl. No. 13/570,831, filed Aug. 9, 2012.
International Search Report mailed Mar. 11, 2013, for International Patent Application No. PCT/US2012/054507 filed Sep. 10, 2012, pp. 1-3.
Written Opinion mailed Mar. 11, 2013, for International Patent Application No. PCT/US2012/054507 filed May 16, 2011, pp. 1-7.
Final Office Action mailed Mar. 19, 2013, in Co-Pending U.S. Appl. No. 13/477,981, filed May 22, 2012.
Scott, S.L., "A modern Bayesian look at the multi-armed bandi," Appl. Stochastic Models Bus. Ind. 2010; 26:639-658.
Chen, Y., et al. "Real-Time Bidding Algorithms for Performance-Based Display Ad Allocation," *KDD'11*, Aug. 21-24, San Diego, CA, Copyright 2011 ACM.
U.S. Appl. No. 61/708,560, filed Oct. 1, 2012.
U.S. Appl. No. 61/730,456, filed Nov. 27, 2012.
Co-Pending U.S. Appl. No. 13/653,394, filed Oct. 16, 2012.
Co-Pending U.S. Appl. No. 12/913,138, filed Oct. 27, 2010.
Co-Pending U.S. Appl. No. 13/698,037, filed Nov. 14, 2012.
Non-Final Office Action mailed Sep. 27, 2012, in Co-Pending U.S. Appl. No. 13/570,831, filed Aug. 9, 2012.
Non-Final Office Action mailed Oct. 11, 2012, in Co-Pending U.S. Appl. No. 12/913,138, filed Oct. 27, 2010.
Non-Final Office Action mailed Nov. 8, 2012 in Co-Pending U.S. Appl. No. 13/605,915, filed Sep. 6, 2012.
Final Office Action mailed Dec. 7, 2012, in Co-Pending U.S. Appl. No. 13/478,020, filed May 22, 2012.
Restriction Requirement mailed Jan. 30, 2013, in Co-Pending U.S. Appl. No. 13/540,538, filed Jul. 2, 2012.
International Search Report for International Patent Application No. PCT/JP2011/061703 filed May 16, 2011, pp. 1-3, English Translation, pp. 1-2.
Written Opinion for International Patent Application No. PCT/JP2011/061703 filed May 16, 2011, pp. 1-5, English Translation, pp. 1-6.
Non-Final Office Action mailed Mar. 21, 2013, in Co-Pending U.S. Appl. No. 13/540,538, filed Jul. 2, 2012.
Non-Final Office Action mailed Apr. 18, 2013 in Co-Pending U.S. Appl. No. 13/605,915, filed Sep. 6, 2012.
Final Office Action mailed Apr. 18, 2013, in Co-Pending U.S. Appl. No. 12/913,138, filed Oct. 27, 2010.

\* cited by examiner

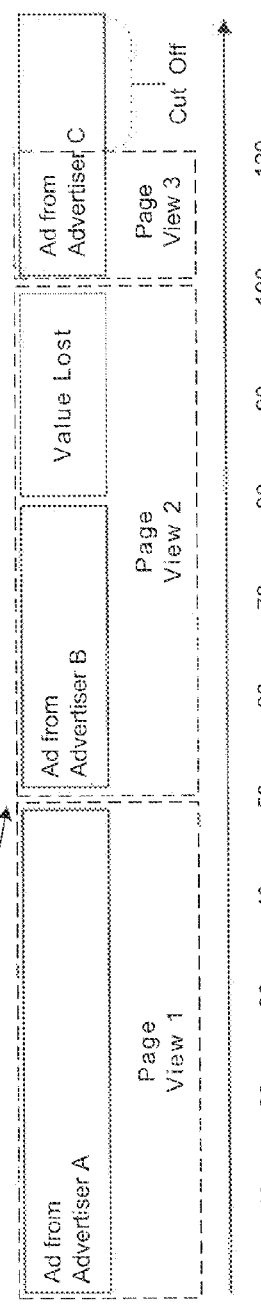
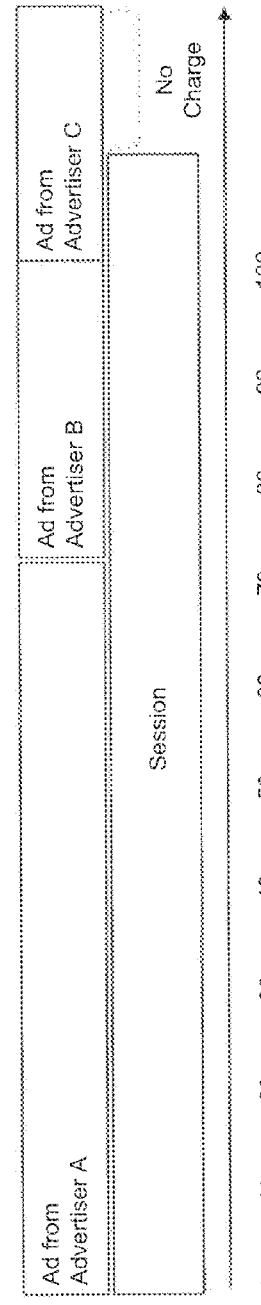

What is effective Cost Per Second (eCPS)?

An index to evaluate the truly appropriate value of ads based on an analogy with eCPM $$eCPM = CPC \times CTR \times 1{,}000 \qquad eCPS = eCPM \times \frac{eIMP}{PV}$$

How does eCPS value differ from eCPM value?

| | CPC | CTR | eCPM | PV | Average Page View Length | Total Engagement | Average Ad Length (AAL) | eIMP | CPS | eCPS |
|---|---|---|---|---|---|---|---|---|---|---|
| Search | $0.3 | 1.0% | $3.0 | 1M | 8s | 40Ms | 15s | 0.53M | 0.025¢ | $1.60 |
| Social Media Era | $0.3 | 0.1% | $0.3 | 1M | 35s | 35Ms | 15s | 2.33M | 0.0025¢ | $0.70 | eCPM ⎯⎯⎯⎯⎯⎯⎯⎯ eCPS

*FIG. 3D*

What is Gross Rating Point (GRP)?
Product of the percentage of the target audience reached by an ad and the ad frequency in a campaign
If a 15s ad was shown 3 times during a 10% reach show, in Tokyo with 5.35M households, where the cost per GRP is $1,000...
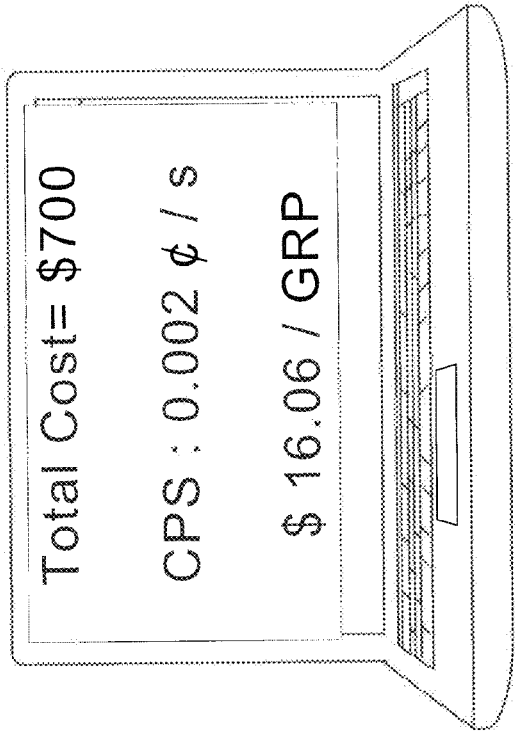
Total Cost= $700
CPS : 0.002 ¢ / s
$ 16.06 / GRP
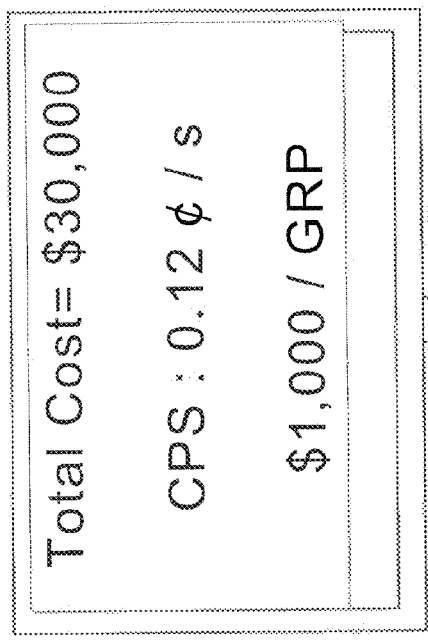
Total Cost= $30,000
CPS : 0.12 ¢ / s
$1,000 / GRP
*FIG. 6B*

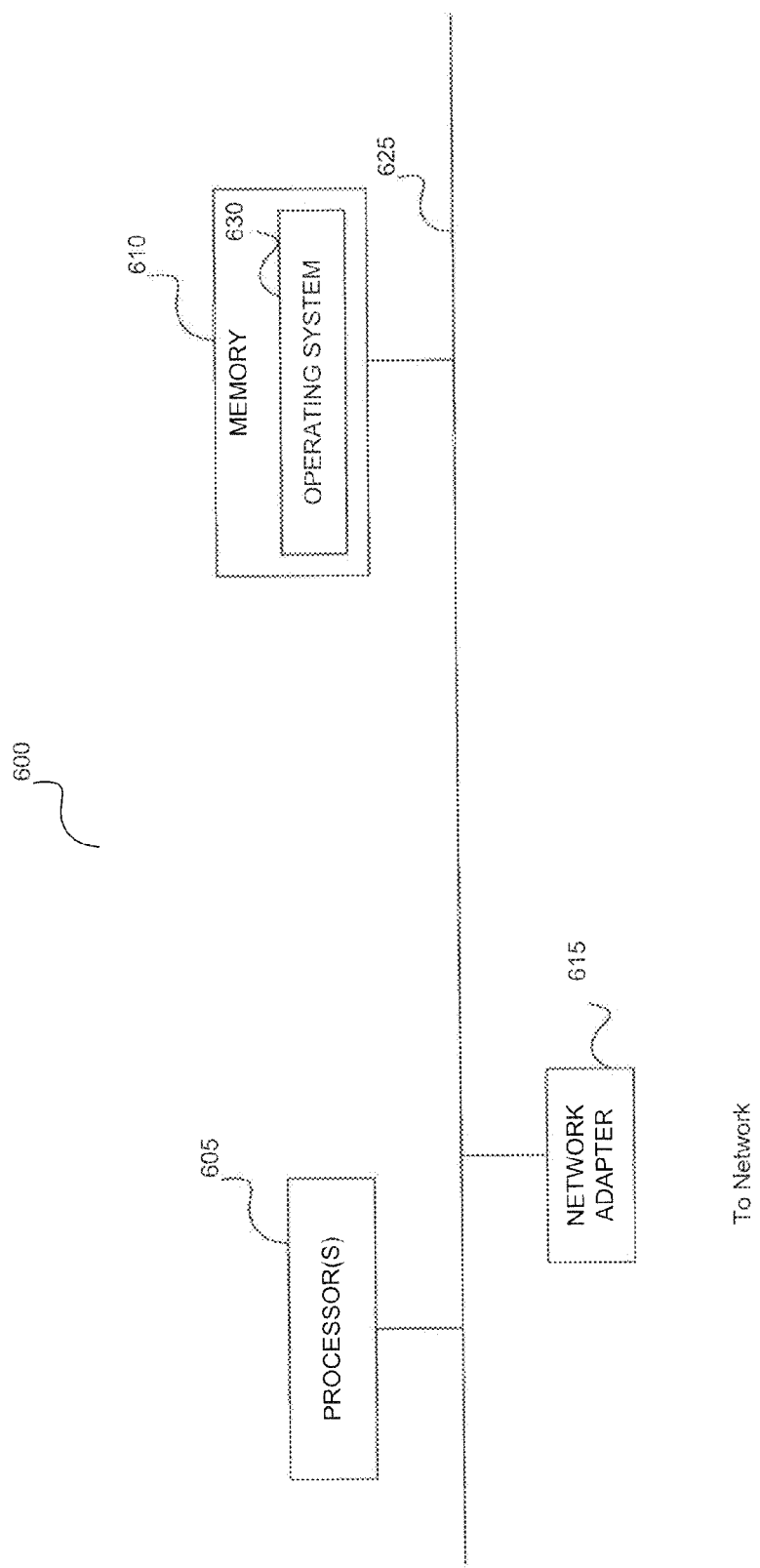

Key Performance Indicators (KPIs)

Conventional

| | |
|---|---|
| Impressions | 8,564,439 |
| Clicks | 27,984 |
| CTR | 0.33% |
| Conversions | 2,546 |
| CTR | 7.2% |

CPS Platform

| Keyword | Impression Time | Effective Immpressions |
|---|---|---|
| Baseball | 12,642,439 sec | 842,763 |
| New York | 8,514,319 sec | 567,621 |
| Hat | 5,189,153 sec | 345,944 |

| Media | Impression Time | Effective Immpressions |
|---|---|---|
| ESPN.com | 15,194,102 sec | 842,763 |
| New York Times | 4,552,681 sec | 567,621 |
| Glam Media | 2,591,287 sec | 345,944 |

METHODS AND SYSTEMS FOR PROCESSING AND DISPLAYING ADVERTISEMENTS OF VARIABLE LENGTHS

CLAIM OF PRIORITY

This application claims priority to the following applications, all of which are Japanese Patent Application. No. 2011-197718, filed Sep. 9, 2011; U.S. Provisional Patent Application No. 61/540,164, filed Sep. 28, 2011; and U.S. Provisional Patent Application No. 61/568,594, filed Dec. 8, 2011.

FIELD

The present invention generally relates to methods and systems for processing and displaying advertisements for which the length of display can be set freely and flexibly. Such processing may include, for example, providing a bidding platform, providing a baseline for assessing and converting costs associated with such advertising, etc.

BACKGROUND

Advertising in the field of e-commerce comprises several different types and modes of advertising, such as, for example, search based advertising, branding advertising, etc. One of two main types of advertising mechanisms or e-commerce based advertisements is the "Direct Response Advertisement," such as Cost-Per-Click (CPC) in which cost accrues for clicks, or Cost-per-Action (CPA) in which cost accrues in the event of a particular action or conversion. The other major type of e-commerce based advertisement is "branding advertisement" in which cost accrues not based on clicks, actions or effectiveness, but based on the number of "impressions," usually in lots of one thousand impressions, or Cost-per-Mille (CPM). An online advertisement impression is a single appearance of an advertisement on a web page. Each time an advertisement loads onto a user's screen, the ad server may count that loading as one impression.

There exist other methods that are classified according to how the display space of an online page is determined, and applies to both of the abovementioned "main types" of advertisements. These types of advertisements include keyword-targeting advertisements in which advertisements that are relevant to the keywords that the user has entered into search engines are shown along with the search results, or content-matching advertisements in which advertisements that are relevant to or match the contents of the web page are shown. In addition, in terms of the shape and style of the displayed advertisements, there exist certain categories of advertisements including, for example, text advertisements where advertisements are shown in the form of text, and display advertisements where advertisements are shown in the form of images or movies. Advertisements in the form of text, banners or images are shown to the user or audience in a fixed form, and advertisements in the form of movies or videos are looped, but the underlying principle remains the same in that all such forms of advertisements are switched according to certain conditions.

Specifically, for example, in the world of internet and e-commerce, the time that an advertisement is displayed will be the time that the web pages are displayed. In other words, a single advertisement would be shown to the user (over and over again in a looped manner in the context of video based advertisements) from the moment at which the page is displayed to the user until a time at which the user takes some type of action (e.g., moving/jumping to another page, reloading/refreshing the page, etc.). The amount of time before a user moves to another page or reloads the page varies, so the amount of time for which advertisements are displayed will also vary. If the page is shown for a long period, the advertisement will also be shown for a long period.

There exists a problem that the user or users' attention towards advertisements will not sustain for long period if the advertisement is uninteresting or irrelevant to them. Whether or not the user feels that an advertisement is interesting, relevant and engaging to them will usually be determined after several seconds. In other words, if the advertisement is uninteresting to the user, the user will only watch a few seconds of the advertisement, or none of it in the worst case. On the other hand, if the advertisement is interesting to the user, the user knows that he/she is interested in the advertisement by watching a mere few seconds of it. If a single advertisement is shown to the user in the advertisement space (e.g., by being looped through the duration of the user's page visit), it is not beneficial to the user in both cases: where the advertisement matches the user's interest, or where the advertisement does not match the user's interest. This is a wasted advertising opportunity for the publisher of the page, loss in efficiency or efficacy of the advertising for the advertiser, and overall loss in realizable revenue for both the advertiser and the publisher.

In general, the billing systems for online advertisements include: (1) in the case of direct response advertisements: costs accrued for clicks; (2) in the case of branding advertisements: costs based on CPM. For example, direct response advertisements and CPC are advertisements in which cost accrues for the advertiser when the user clicks on an advertisement and progresses or shifts to a website resulting from a click of the advertisement.

In scenarios where the publisher's media has long viewing times (e.g., a lengthy newspaper article) but the click through rate (CTR) is low. The clickthrough rate of an advertisement is defined as the number of clicks on an ad divided by the number of times the ad is shown (impressions), expressed as a percentage. A low CTR would mean that when selling direct response advertisements, useless advertisements that do not generate value are shown repeatedly to the user, thus reducing the overall advertising efficacy for both the publisher and the advertiser. This results in significant loss of opportunity.

Presently, billing for advertisements is predominantly according to CPM models, especially for branding advertisements. According to the CPM model, advertisers bid (sometimes through Real Time Bidding) for certain advertisement spaces as a function of 1,000 PVs (1000 page views). That is, the bid price is set for each 1000 PV count. Such a CPM model does not take into account critical factors such as an amount of time for displaying advertisements, etc. This results in the advertisers never knowing for what period of time (total number of seconds) the advertisement had a branding effect for the user, and in effect, blindly placing advertisements based on page views without any realization or consideration for what type of a branding effect or other ROI the online advertising campaign provides.

BRIEF DESCRIPTION OF DRAWINGS

These and other objects, features and characteristics of the present invention will become more apparent to those skilled in the art from a study of the following detailed description in conjunction with the appended claims and drawings, all of which form a part of this specification. In the drawings:

FIGS. 6A and 6B illustrate computation of Gross Rating Point (GRP); and

FIG. 7 is a high-level block diagram showing an example of the architecture for a computer system.

Figure 1:
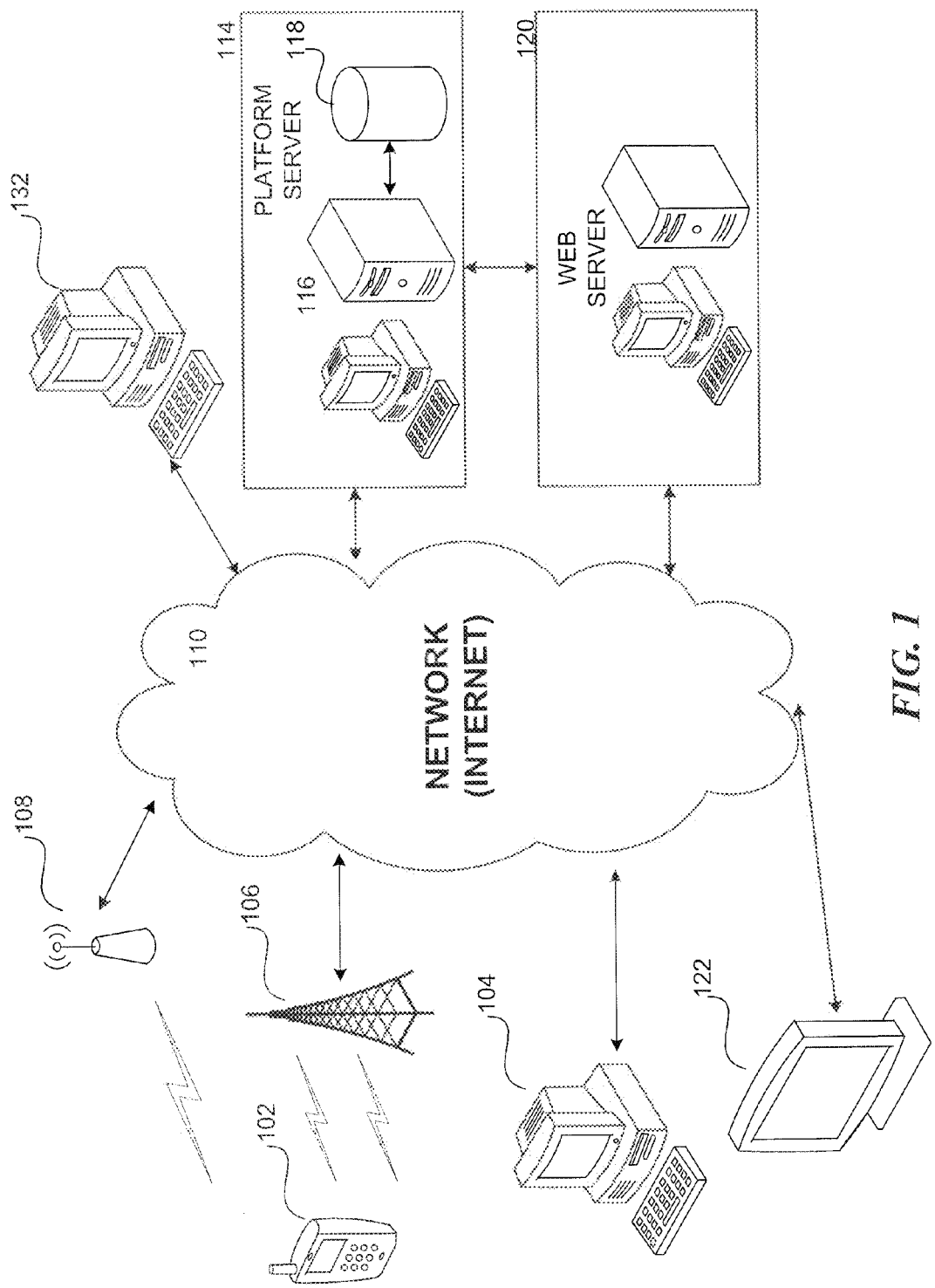
FIG. 1 provides a brief, general description of a representative environment in which the invention can be implemented.

The headings provided herein are for convenience only and do not necessarily affect the scope or meaning of the claimed invention.

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 114 is first introduced and discussed with respect to FIG. 1).

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

FIG. 1 and the following discussion provide a brief, general description of a representative environment in which the invention can be implemented. Although not required, aspects of the invention may be described below in the general context of computer-executable instructions, such as routines executed by a general-purpose data processing device (e.g., a server computer or a personal computer). Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," and the like are used interchangeably herein, and may refer to any of the above devices and systems.

While aspects of the invention, such as certain functions, are described as being performed exclusively on a single device, the invention can also be practiced in distributed environments where functions or modules are shared among disparate processing devices. The disparate processing devices are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data related to the invention may be distributed over the Internet or over other networks (including wireless networks), on a propagated signal on a propagation medium (e.g., an electromagnetic wave(s), a sound wave, etc.) over a period of time. In some implementations, the data may be provided on any analog or digital network (packet switched, circuit switched, or other scheme).

As shown in FIG. 1, a user may use a personal computing device (e.g., a phone 102, a personal computer 104, etc.) to communicate with a network and/or view displays communicated via the network 110. The term "phone," as used herein, may be a cell phone, a personal digital assistant (PDA), a portable email device (e.g., a Blackberry®), a portable media player (e.g., an IPod Touch®), or any other device having communication capability to connect to the network. In one example, the phone 102 connects using one or more cellular transceivers or base station antennas 106 (in cellular implementations), access points, terminal adapters, routers or modems 108 (in IP-based telecommunications implementations), or combinations of the foregoing (in converged network embodiments). In some instances, one or more users may also use an electronic display 132 (e.g., an electronic overhead display, an electronic billboard display, etc.) to view information communicated via the network. In the context of this description, information communicated may include, for example, advertisements displayed either by themselves or advertisements displayed in conjunction with web pages or other online media a user may be watching/experiencing. Concepts behind display of such advertisements will be explained in further detail in the following sections.

In some instances, the network 110 is the Internet, allowing the phone 102 (with, for example, WiFi capability), the personal computer 104, or the electronic display 122 to access content offered via various servers (e.g., web server 120) connected via the network. In some instances, especially where the phone 102 is used to access web content through the network 110 (e.g., when a 3G or an LTE service of the phone 102 is used to connect to the network 110), the network 110 may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), etc.

In some instances, a user uses one of the computing devices (e.g., the phone 102, the personal computer 104, etc.) to connect to an platform server 114 through the network 110. In one embodiment, the platform server 114 comprises a server computer 116 coupled to a local database 118. The term "platform server" as indicated herein, refers to an individual or multiple server stations or other computing apparatus. In one embodiment, the platform server is a web server capable of hosting a website and storing content (e.g., various webpages) that is associated with the website. In some embodiments, the platform server is separate from a web server, but communicates with a web server to provide, manage, and/or control content generated by the web server. In general, the platform server 114 includes various modules (either implemented as software or in hardware) that allow for advertising information to be collected from advertisers wishing to strategically engage in an advertising campaign, and to coordinate and relay ensuing advertisements to end systems. In embodiments, the platform server may independently coordinate the processing and eventual display of advertisements. In embodiments, as will be explained in the example of FIG. 2, the platform server may offer interfaces (e.g., APIs) to existing advertising network platforms to coordinate one or more specific advertising activities (e.g., providing abilities for bidding, providing campaign conversion modules, etc.) as will be explained in further detail below. As will also be explained in further detail herein, the administration server 114 incorporates one or more functional units to achieve each of the above discussed functionalities.

As shown in FIG. 1, in some embodiments, the personal computing devices and the administration server 114 are connected through the network 110 to one or more web servers (e.g., web server 120). Each web server corresponds to a computing station that enables a website provider, for example, to provide web content (e.g., web pages) that can be accessed by the personal computing devices through the network 110.

An platform server, as defined herein, could be a separate server offering the service described herein to, for example, one or more website providers. In other examples, the administration server could by itself be a website provider that also runs a service that accomplishes the techniques described herein. Additional examples of implementing an administration server, as understood by a person of ordinary skill in the art, are equally suitable for implementing the techniques described herein.

In the context of the systems described herein, in one embodiment, the platform server is implemented as a search system that enables advertisement display measures, allowing one or more advertisements to be shown either simultaneously or at various discrete timings based on advertisement data obtained through the network (e.g., from an advertising client 132). The platform server 114 may then communicate the advertisement to an advertisement display system (e.g., the user's personal computing device) in which the individual advertisements are shown for a predetermined length of time or according to variables established by the advertising client.

Consider an exemplary scenario where distinct advertisements x1, x2, x3, . . . xp are to be shown to the user as processed and output by the platform server 114. These advertisements are predetermined to be displayed for lengths of t1, t2, t3, . . . tp. However, this does mean that the advertisement to be shown is also predetermined. For example, if a user browses and views the internet using a PC, various advertisements may be shown for various situations, and the techniques described herein includes the case in which these advertisements are shown and sustained for a predetermined length of time.

An advertisement, as described herein, includes without limitation movies, still images, banners, animated pictures, etc. As processed by the platform server, such advertisements are shown for a period and such periods may be predetermined, for example, by the advertiser. In cases where the advertisement is a movie, either the length of the prepared movie or the play time designated by the advertiser will be the display time for the advertisement. In cases where the advertisement is a still image, the display time will be the time designated by the advertiser.

The "display" of an advertisement refers to display of an advertisement that can be substantial or meaningful. For example, on a web screen, if the user scrolls down on the screen, it is preferable that the advertisement scrolls alongside to fit the screen on which it is displayed. However, if the above method is not possible and the user scrolls the screen to the extent that the advertisement is no longer visible on the screen displayed, the advertisement should be stopped, and the time that the advertisement had been played should be recorded (at least for the purpose of computing cost per second of display of the advertisement, as will be explained further below). When the advertisement returns to display on the screen, the advertisement should be resumed, and the total playing time will be recorded at the end of the advertisement or at the time of the next stop. The judgment of "whether the advertisement is displayed or not" can, for example, be that if a certain proportion of the advertisement is not shown within the screen, the advertisement can be considered to be "not displayed on the screen". Here, a "certain proportion" can refer to a proportion at which substantial viewing of the advertisement can be deemed to be difficult, for example at a proportion of 50% or more. However, more than 50% is merely an example, and the proportion need not be limited to 50% or more. For example, the advertisement display can be divided into a major portion (e.g. the portion where the product or service name to be advertised is shown) and a minor portion, and when the major portion is shown on the screen, it may be judged that the advertisement is displayed on the screen.

The techniques discussed herein include a bidding system that allows an advertiser to place a bid for a certain spot and duration of advertisement. As illustrated with respect to FIG. 2, the platform server 114, in some embodiments, may include a bidding platform module 202 to enable the bidding operations. In the way of an example, the bidding platform module may present an appropriate GUI to the advertising client 132 to enable the advertiser to make appropriate selections and provide input. These are then taken in by the bidding platform module 202 for further processing and assessing for bidding.

In situations where the advertiser is aware of the display length beforehand, in embodiments, the advertiser may use bidding as the method of advertisement display time sales ("purchase" from the advertisers' perspective) in order to determine the order of precedence when displaying the advertisement(s). In other words, the amount of advertisement that can be displayed within an advertising space is generally finite. In addition, for web screens, if there is more than one advertisement that can be shown on the same advertisement space, the order in which the advertisements becomes important. Specifically, when displaying advertisements on a specific advertisement space or for specific keywords, an input is made (e.g., in the form of a bid) for the maximum cost/price that the advertiser can bear for that particular combination of duration and order. It is evident that the order or precedence will be higher when this cost/price is higher.

Cost Per Second (CPS) Based Technology

In at least some embodiments as disclosed herein, the length of time that an advertisement will be shown will vary not only according to the advertisement itself, but also according to secondary factors (e.g., keywords, search relevance, etc.). For example, when publishing an advertisement on a search result page, conventionally, bids are placed for a certain keyword A, and the advertisement to be displayed with higher priority is determined and fixed according to this price. On the other hand, for this invention, comparisons are not made according to the price per display (or impression) of an advertisement, but by the bid on the price per unit of time, or Cost per Second (CPS). Bids can be placed directly through CPS, or the cost per advertisement can be used as the unit of bid, and divided by the number of seconds of advertisement display in order to calculate the CPS to compare prices between various advertisements.

For example, assume that there exist two advertisement spaces (F1 and F2) on a search result page for a certain keyword A, and that the advertisement effect of advertisement space F1 excels that of advertisement space F2. If advertiser D1 bids for price P1, advertiser D2 bids for price P2, advertiser D3 bids for price P3 and P1>P2>P3, conventionally, advertiser D1 won advertisement space F1, advertiser D2 won advertisement space F2 and advertiser D3 could not win an advertisement space. As a result, the publisher/media can only utilize two advertisement spaces (and lose revenue from advertiser D3), and advertiser D3 would lose the opportunity to advertise.

However, using technology introduced herein, for example, the publisher/media can sell the two advertisement spaces (F1 and F2) separately at the time of the bid. For example, for advertisement space F1, advertiser D1 bids for a CPS price P1, advertiser D2 bids for a CPS price P2, advertiser D3 bids for a CPS price P3 and P1>P2>P3, the advertisement display time for F1 can be sold to advertiser D1, advertiser D2 and advertiser D3 in the respective order.

Additionally, if the total time that the advertisements are played for each advertisers D1, D2 and D3 are T1, T2 and T3, respectively, in simple terms, the publisher/media receives an advertising revenue of P1×T1+P2×T2+P3×T3 (in reality, if the displayable time exceeds T1+T2+T3, the order of priority will be determined as D1>D2>D3. Additionally, the order of priority can be changed according to other factors such as the time in the day, etc.). As a result, the publisher/media can utilize their advertisement space with higher efficiency, and each advertiser will be able to display advertisements with higher efficacy. In other words, if each advertisers' advertisement (assuming that each had one type of advertisement) has a display length of t1, t2 and t3 per advertisement, each advertiser will be able to publish T1/t1, T2/t2 and T3/t3 advertisements respectively (assuming that there is no upper limit to the display time). For the user, the amount of information received would be greater than the conventional cases in which one advertisement is shown repeatedly. However, it should be noted that the above example is a highly simplified version. Alternately, a better system may be one that incorporates a display method in which the price determination method is consistent with that in the conventional market.

As offered by the CPS technology introduced herein, the advertisement billing is based on CPS×Seconds Displayed. In embodiments, the cost charged to the advertiser is based on the actual display time. This is because the purchase of the advertisement space is not for an entire unit based of a single display, but for the price/cost per second of an advertisement that will be shown only for a certain time length. The "actual display time" should ideally be the "time that the user is actually watching." The actual display time may be measured using techniques as understood by people of ordinary skill in the art at the time of this application. However, in systems where constraints are present due to, for example, cost and facilities, the realistic time measurement used can be the "time that the advertisement is shown on the screen". In other words, the advertisement display time will be measured as the "period in which the advertisement is displayed on the screen".

Accordingly, in embodiments, advertisements are shown for a certain periods of time. In other words, the advertisements displayed will have a designated order or priority, and more than one advertisement may be shown continuously in a loop. The order, precedence, and length of running such advertisements may be based on a variety of factors. Such factors may be accounted for, for example, through the bidding platform offered in conjunction with the platform server. An example of such a factor may be an order of priority (e.g. time of the day). When such a factor is introduced, it is not known under which conditions the advertisement should be displayed for higher effectiveness. One way to overcome this issue would be to play the advertisements in varying orders with equal likeliness. When this is the case, a statistically significant sample size will be chosen, and various orders will be tested for this sample. The index when evaluating the effectiveness can be, for example, Seconds per Click (SPC), or the number of seconds necessary until the user clicks the advertisement. Analyzing that information over, for example, the time of day such events occur, statistical information may be collected to determine order of priority and corresponding bid value for placing advertisements on the web screens. Using these results, the advertisements can be shown in the order of this index.

The explanation illustrated an example of a case in which advertisements are shown on a search result page, but it is understood that the techniques discussed herein may be applied to a variety of other advertisement types as well. For example, the techniques introduced herein include a novel online advertisement concept where direct response advertisement and branding advertisement are both combined (the product of the two is taken). Correspondingly, there are two main types of advertisement sales: (1) the CPS (cost per click) mode of advertisement sales (as discussed above); and (2) the product of CPS and Cost per Click (CPC), which would be CPS×CPC. CPS is the price per second of advertisement display, and CPC is the cost that the advertiser bears when a user clicks on an advertisement while watching an advertisement and jumps to a website designated by the advertiser. In order to determine the order of priority of advertisement display, the prices of advertisements (e.g., as placed in bid values) are compared, but in an exemplary scenario, a value in which both the CPS and the CPC are included may also be considered in assessing relevance and priority of the bidders. As indicated here, N=CPS×CPC may be a simple case for accounting the CPS and CPC elements jointly, but it is understood that other conversion formulas where the two elements may be effectively considered may also be used.

Figure 2:
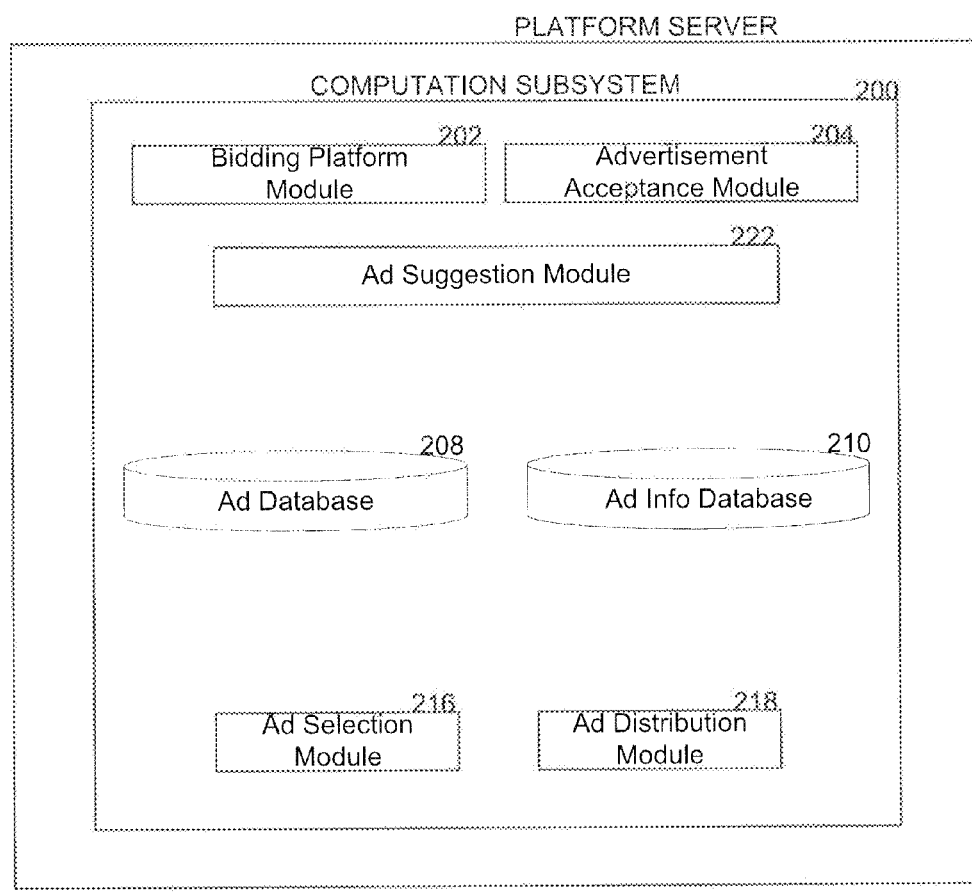
FIG. 2 is a block diagram illustrating an exemplary architecture of a platform server.

In embodiments, the platform server 114 includes logic for the purposes of determination of the two types of cost determination and to identify targets and correlation between the two types. In embodiments, and as illustrated in FIG. 2, the platform server may include one or more of the following modules, each being implemented either in hardware, software, or firmware, or a combination thereof: an advertisement (or ad) suggestion module 222 to make determinations and provide according suggestions as to the type, content, duration, etc. of advertisements to be placed on various publishers' sites. The logic incorporated in this module may include, for example, algorithms to identify significance, meaning, context, relevance, etc. of a particular website and accordingly identify relevant advertisements. Further, the platform server 114 may include an advertisement accepting means 204 for accepting advertisements uploaded by advertising clients 132. In embodiments, the platform server 114 may also include advertisement memory 208 for storing advertisements received from advertisers and advertisement information memory 210 for storing information related to advertisements (e.g., relevance information, order or priority information, etc.). In some instances, the modules may further include an ad selection module 216 and an ad distribution module 218 that are configured respectively to select an appropriate ad and to transmit the ad to a predetermined web screen based on determinations made by the platform server.

In embodiments, these include means that are accessible online by the advertiser. Each component/module identified above may be implemented as discrete software or hardware units or a combination thereof. In embodiments, for example, the advertisement space suggestion module to suggest advertisements for publishing on advertisements spaces and the advertisement bidding means can be combined into or be coupled to a web server 120. In embodiments, the structure of the platform may include, for example (in the case of displaying advertisements in a search result page), a GUI to suggest a page in which the keywords used for the search, the various attributes of the user to which the advertisement is desired to be displayed (gender, age, region, profession, educational background, hobbies, etc), the preferred time of the day to display the advertisement can be entered, etc. According to these entered inputs, the price per unit of time for purchasing the advertisement space and the entry field for purchasing the advertisement space (or an entry page) will be then be displayed. For the suggested advertisement space, the advertiser inputs (e.g., through the bidding platform) the desired price per unit of time to purchase the advertisement space, and the number of advertisement spaces to purchase. However, in embodiments, the purchasing of advertisement space can be for the total length of time that the advertisement will be displayed.

In embodiments, the advertisement information memory 210 and the advertisement data memory 212 to store the advertisement itself may include, for example, advertisement information database means to store information related to the advertisement and an advertisement data database means respectively to store the advertisement itself.

To reiterate, the CPS methodology for pricing advertisements has unique fairness and efficiency considerations over conventional systems as outlined below.

Fairness: With the adoption of the CPS methodologies discussed herein, pricing becomes fair relative to conventional systems. For example, an advertiser uploads a 15-seconds ad, bids $0.02/sec for CPS, and an optional $0.3 for CPC. If a user stays 10 seconds and clicks on the ad, the advertiser pays $0.50. If the user stays for 2 seconds and does not click, the advertiser pays $0.04 (FIG. 2-1). That contributes to considerable improvement in fair value-for-money (VFM).

Figure 3E:
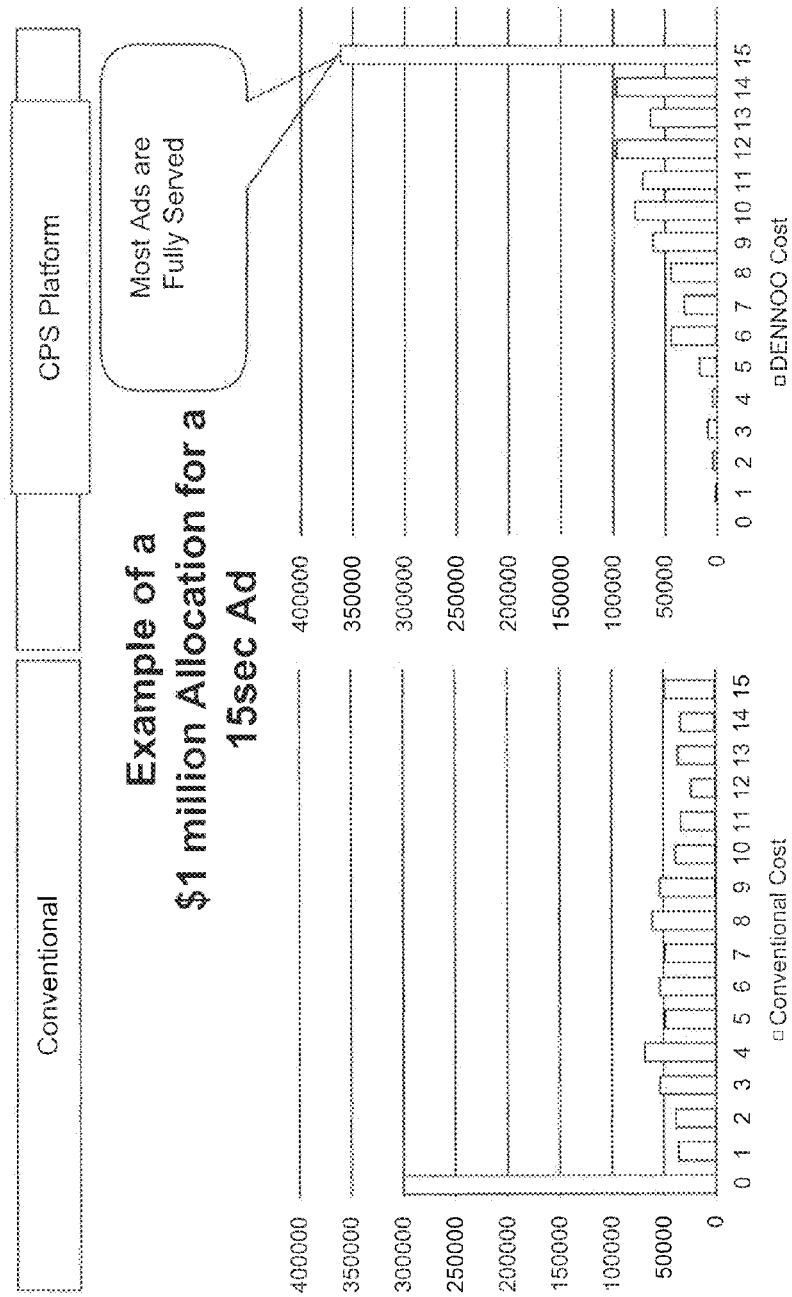
FIGS. 3A and 3B illustrate differences in page and session view usage between conventional methods and CPS-backed methods.
FIG. 3C proposes a model for effective CPS and how illustrates how this effective value compares against traditional advertising billing schema.

Efficiency: Session and page view usage becomes efficient with use of CPS methodologies discussed herein. For example, as illustrated in FIG. 3A, in conventional display ads, sessions were dissected into large chunks (i.e. page views), and ads either only took up a portion of the page view, or conversely, the page view was not long enough to show the entire ad. This typically leads to severe loss in efficiency: lower VFM for advertisers, and smaller, less efficient inventory for publishers. However, the use of the CPS methodology, as illustrated in FIG. 3B, full sessions can become the largest unit, dissected finely into seconds. Thus, for example, of a 95-second session, 60 seconds can be allocated to advertiser 1 (e.g. prestigious advertiser showing long, high-quality ads), another 25 seconds to advertiser B, and another 10 seconds to advertiser C. Sessions can be tailored to the exact needs of advertisers. Page views will no longer matter, and the flexibility, efficiency and effectiveness of advertisements improve significantly. When this revived value is aggregated for the entire market, the overall opportunity and improvement is enormous.

Returning back to the illustration of FIG. 1, the process of utilizing the platform server to process and display advertisements is now explained with respect to two scenarios: (1) when the advertisement is returned to a user viewing the advertisement in a web screen; (2) when the advertisement is displayed to multiple users over an electronic display instrument (e.g., an electronic bill board).

As illustrated in FIG. 1, when the advertiser accesses the bidding platform module of the platform server 114, the system, for example, suggests an entry field for the desired conditions regarding the advertisement display. The advertiser 132 inputs the desired conditions accordingly. In response, the platform server 114 may request entry of an advertisement. The received advertisement and advertisement information is then stored in the advertisement video database and the advertisement information database by the advertisement reception device. In embodiments, the information stored in the advertisement video database and the information stored in the advertisement information database are related and attributed by an advertisement ID that is unique to each advertisement. In embodiments, when the advertisement information is transmitted to a display device, the related information may also be attributed by the advertisement ID.

In the first scenario, the user typically has an advertisement display device that is loaded into the web browser (e.g., a widget within a web page, etc.). At this time, in order to display advertisements that match the user's interests, information regarding the page shown and user IDs are sent to the advertisement selection device of the platform server. An advertisement selection module 216 selects the advertisement(s) to be displayed based on the received information and the advertisement data stored in the advertisement information database. The advertisement selection module 216 selects the advertisements to be shown, and the advertisement ID of the advertisement to be shown will be sent to the advertisement screening device (e.g., the user's computer).

After receiving one or more advertisement IDs from the advertisement selection module 216, the advertisement transmitting or distribution module 218 sends one or more advertisements continuously to the advertisement display device. The advertisement screening device displays the advertisement to the user upon reception. For videos, the display time is generally determined by the length that the video advertisement is played. For still images, the display time is determined by the time designated by the advertiser.

Figure 4:
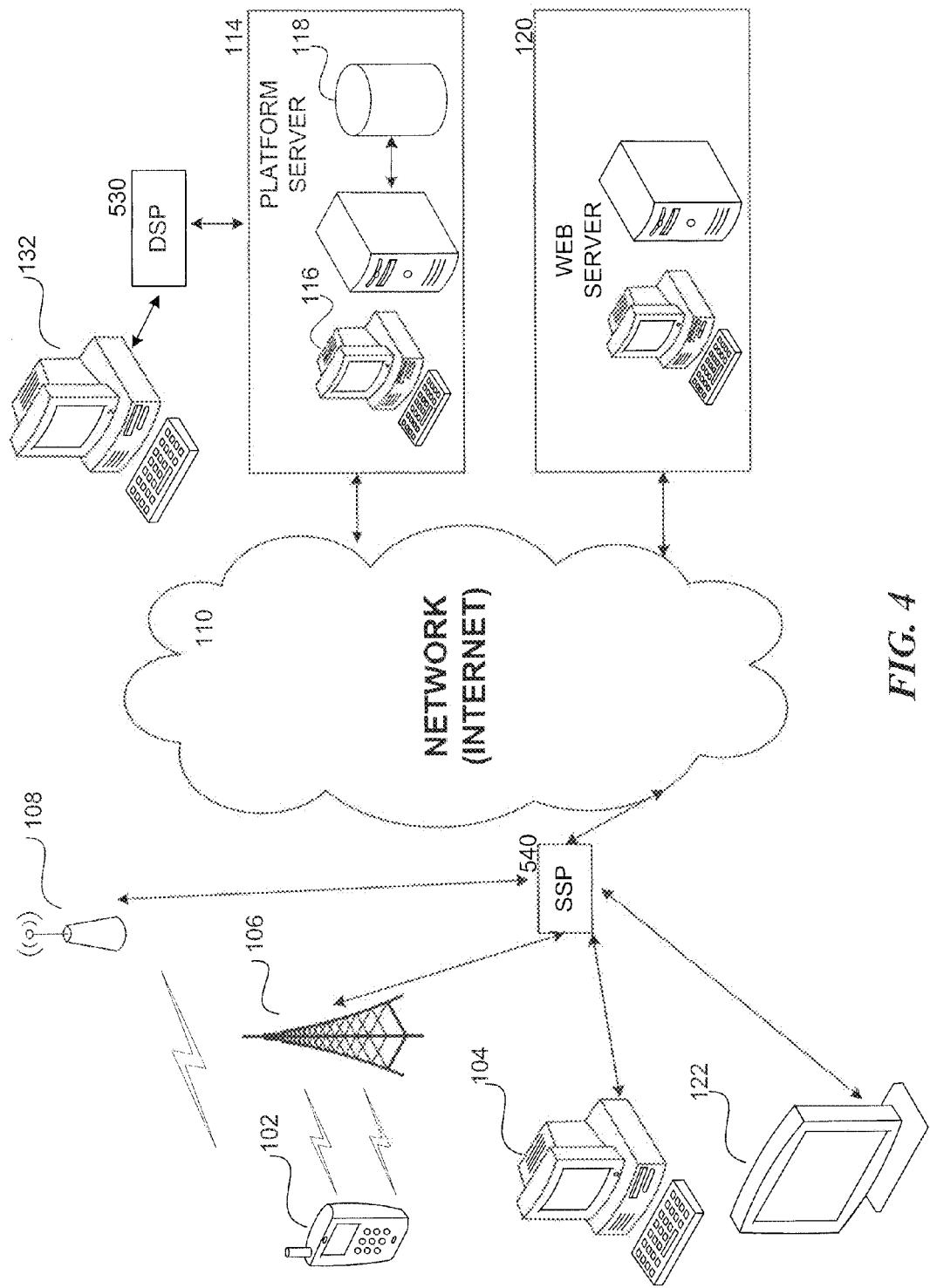
FIG. 4 provides a brief, general description of a representative environment in which a second embodiment of the invention can be implemented.

FIG. 4 illustrates the second scenario, where the advertisement display device with which the user watches advertisements is not equipped on the browser, but rather a device that is connected to the internet, such as on an LCD display for street advertising (e.g., device 122). In this scenario, the advertisement display device is not equipped on a web browser, so information as to the basis of selecting the advertisement to display may not exist. In such cases, the advertisement display device does not send out information for advertisement selection, but instead just display the advertisements continuously in a predetermined order. However, for example, if a digital signage device is located in various stores and locations, it is possible that conditions for selecting the advertisement, such as showing it on a device in a ramen noodle store in the shopping quarters from 5 PM to 11 PM, are specified and the advertisements are shown accordingly. In such cases, the advertisement that best matches such conditions may be selected. For videos, the display time is generally determined by the length that the video advertisement is played. For still images, the display time is determined by the time designated by the advertiser A third scenario of processing and displaying advertisements in accordance with the techniques discussed herein is illustrated with reference to FIG. 4. In this example, the publishing of advertisements and the displaying on the advertisement viewing device are carried out not directly between the advertiser and the user, but by using interfaces to a Demand Side Platform (DSP) 530 and a Supply Side Platform (SSP) 540. The composition of this exemplary embodiment constitutes an advertisement exchange that can incorporate the present teachings with conventional advertising exchanges.

In embodiments, either the DSP, SSP or both may be included. The composition can be either through a connection with the DSP, a composition with a direct connection to the advertiser, or a combination thereof. Similarly, the composition can be either through a connection with the SSP, a composition with a direct connection to the user, or a combination. Other similar combinations of one or more DSPs and SSPs, as may be contemplated by a person of ordinary skill in the art, may also be used as alternate or variants of the above discussed composition.

In this example, when the advertisement is sent by the advertiser, it is stored in the DSP, which acts as the mediator on the advertiser's side. The DSP then selects an advertisement exchange from among the advertisement exchanges, and the advertisement is published. In order for the device devised by this invention to receive the advertisement, a bid to determine the price of the advertisement is received from the advertiser through the DSP.

Figure 5:
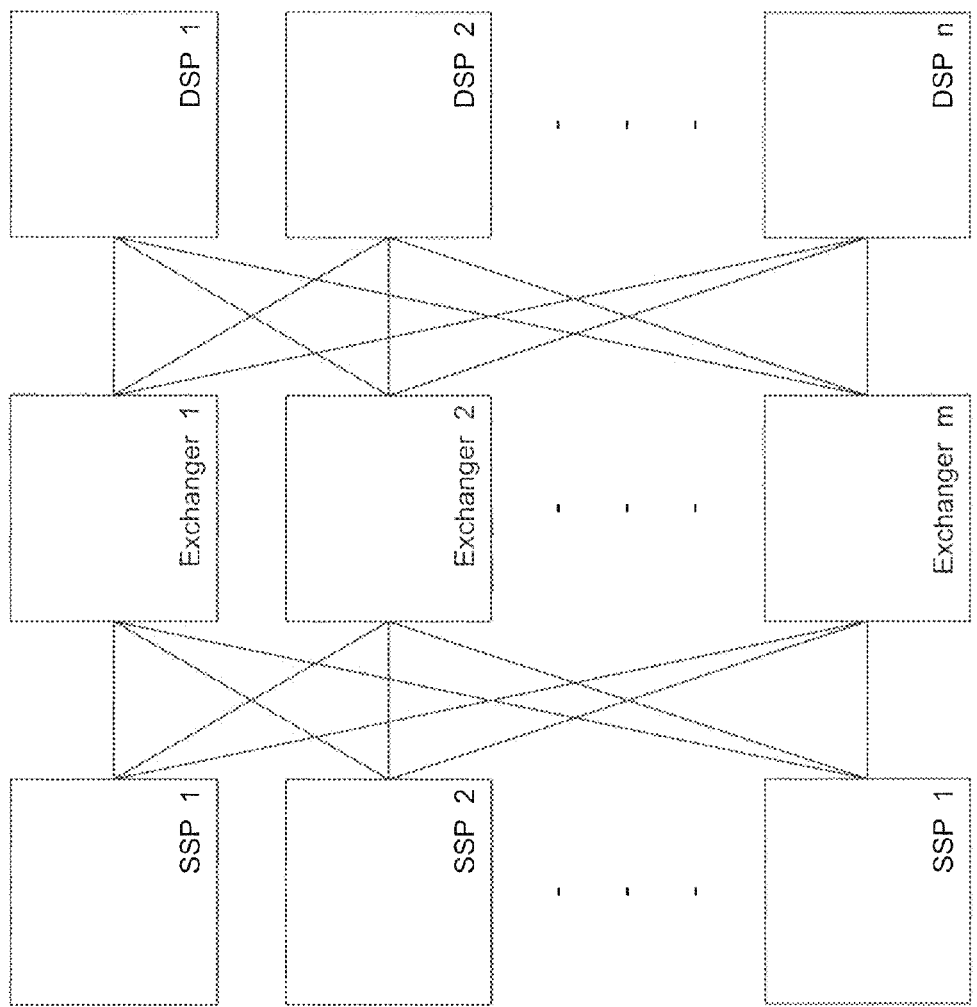
FIG. 5 is a schematic diagram that shows an example of the relationship between page transition and advertisement display in one embodiment of the technology introduced herein.

On the other hand, on the user's side, the advertisement is received not directly from the device devised by this advertisement, but from the SSP, and the advertisement is shown. After receiving the advertisement display request from the user, the SSP selects one or more advertisement exchanges to receive advertisements from, and requests for advertisements. At this time, the system (advertisement exchange) devised by this invention, which has received the advertisement request, also receives information necessary to select the advertisement that best matches the user, and according to this information, chooses the best-match advertisement from the displayable advertisements, sending the advertisement to the SSP. After receiving the advertisement, the SSP sends the advertisement to the user, and the user watches the advertisement. One such exemplary composition is illustrated in FIG. 5.

In embodiments, with such a composition, the advertising side can increase the effectiveness of their advertisement by widening the array of media/publishers to display their advertisements on. The results in quantifiable advantages on both sides of the spectrum—on the media/publisher side that will show advertisements, revenue for advertisement spaces increases by allowing for selection from a larger number of advertisements the advertisement that best matches the users' interests. From the users' perspective, for similar reasons, advertisements will be chosen from a greater variety, and the users will be able to watch advertisements that match the users' interests.

Conversion Approaches for Conventional Vs CPS-Based Billing Schema

As illustrated in scenario 3 above (with reference to FIG. 5), advertisement bidding by the advertiser may also be conducted through DSPs. In such cases, because conventional internet advertisements bids are placed based on the Cost per Click (CPC) or the Cost per Mille Impressions (CPM), and bids according to the technologies described herein are placed either based on Cost per Second (CPS) or a function of CPS and CPC (e.g., CPS×CPC) for branding as well as direct-response-hybrid-bidding, the various modes of bidding cannot be compared readily. Therefore, a conversion formula is very useful in allowing an advertiser to readily understand the impact of this new approach and also appreciate the cost savings and efficiency of the CPS based approach. Some such conversion approaches are described herein.

Process by which eCPM Value is Conevrted into eCPS Value.

The effective Cost per Mille (eCPM), or the cost for displaying an advertisement 1000 times for a subject to be displayed, based on past data, is used as a standard for bidding prices. Generally, in such cases, comparison of CPM and CPC is done with eCPM as the intermediary. In other words, when the expected or actual Click Through Rate (CTR) is considered, $$eCPM = CPC \times CTR \times 1000 \qquad (1)$$

First, effective CPS (eCPS) is defined as below:

$$eCPS = eCPM \times \frac{eImp}{PV} \qquad (2)$$

where PV is "page view", eImp is "effective impression", and eCPM is "effective CPM". eCPM is defined above as indicated in equation (1). Effective impression (eImp) is a value that is incorporated in the conversion, and is defined as:

$$eImp = \frac{PV \times eAPVL}{AAL} \qquad (3)$$

Here, AAL is the average ad length, which is the average length of all ads on the media under consideration. eAPVL, or the effective average page view length is defined as the sum of all ad view lengths (AVL) on the media divided by the total number of page views (PV) on the media. The equation is below:

$$eAPVL = \frac{\Sigma AVL}{PV} \qquad (4)$$

Based on the above equations, eCPS may also be written as:

$$eCPS = eCPM \times \frac{eAPVL}{AAL} \quad (5)$$

With the above equations, accordingly, eCPM value may then be converted to an eCPS value. See, e.g., FIG. 3C for an approach for comparing eCPM to eCPS and to determine how eCPS value differs from traditional values. Further, In the above equations, the left side of the equation is the value devised based on the techniques introduced herein, and the right side of the equation is the value based on conventional technology. Using such conversion formulas, a value that corresponds to eCPM can be calculated in the system devised as a result of the techniques disclosed herein, allowing the variable length advertisement display system of the present application and other conventional systems to exchange advertisements seamlessly. It is noted that the equation illustrated above is merely an example, and that other conversion formulas, as may be evident to a person of ordinary skill in the art to be obvious variants of the above equation, are also valid examples.

Illustration of Various Bidding Modes and Associated Conversion Schema

As illustrated above with reference to FIG. 4, the methods and systems disclosed herein also interoperate with conventional systems when, for example, connected via a DSP. The following sections disclose the various types of bidding schemes, including bidding schemes based on conventional parameters may be accepted and how conversion schema may then be applied to allow for interoperability.

Bidding by CPC

Consider a scenario where the advertiser bids by CPC. The system will change the conditions of the advertisement to be shown, and from the collected data, find the condition that yields the best outcome/effect. For the measurement of effectiveness, the click through rate, for example, may be used. By increasing the effectiveness of the advertisement, the advertiser will enjoy better advertisement effect and return on investment, users will be shown ads of greater interest to them, and publishers will become more profitable. In embodiments, this information is continuously collected for learning purposes, and may be used at any point to determine the best advertisement fit for a given scenario. This allows for optimization of the advertisement placement based on present conditions, thus enhancing ROI for placement of the advertisement. In embodiments, machine learning (e.g., neural networks, fuzzy logic, or other machine learning techniques as understood by a person of ordinary skill in the art) may be utilized for such continuous learning. The conditions to be changed and tested include but are not limited to the following: length of ad; time of the day to show ad; position within the page view to deliver the ad; characteristics of the user to which the ad is shown; etc. The sample to be taken will be large enough to yield statistically significant results.

An example of the sampling can be as follows. The deliver time of the ad is x(seconds), the number of times that the ad is delivered is T (times), the cost per second of ad delivery is Cs (yen), the total cost is Ct (yen), then the following equation is true:

$$C_t = x \times T \times C_s \quad (6)$$

Fixing C and solving for T, we obtain, for example, the following chart:

| Seconds of ad delivered | Number of times that the ad is delivered | Cost per second of ad delivery | Total cost |
| --- | --- | --- | --- |
| 10 | 2000 | 0.001 | 20 |
| 11 | 1818 | 0.001 | 20 |
| 12 | 1666 | 0.001 | 20 |
| 13 | 1538 | 0.001 | 20 |
| 14 | 1428 | 0.001 | 20 |
| 15 | 1333 | 0.001 | 20 |
| 16 | 1250 | 0.001 | 20 |
| 17 | 1176 | 0.001 | 20 |
| 18 | 1111 | 0.001 | 20 |
| 19 | 1052 | 0.001 | 20 |
| 20 | 1000 | 0.001 | 20 |
| ... | | | |
| 30 | 666 | 0.001 | 20 |

When reflecting the results of the sampling and ad delivery, this can be based on the number of times the ad is delivered, or on the cost. If it is based on cost, the following example may be anticipated. From a single sampling or ad delivery, we know that the peak of clicks is at time t(seconds), and the distribution of the clicks is S, and another n deliveries are planned, the total cost of delivering k seconds is Ck. Ck can be renewed in the following manner:

When k is between −2S and 2S, $$Ck+=Ck/n$$

When k is not between −2S and 2S, $$Ck-=Ck/n$$

If the peak of the clicks is at 18 seconds, the distribution (deviation) is 3, and there are 5 more deliveries left after the first deliver, the second delivery will be as follows:

| Seconds of delivery | Number of times the ad is delivered | Cost per second | Total cost |
| --- | --- | --- | --- |
| 10 | 1600 | 0.001 | 16 |
| 11 | 1454 | 0.001 | 16 |
| 12 | 1333 | 0.001 | 16 |
| 13 | 1846 | 0.001 | 24 |
| 14 | 1714 | 0.001 | 24 |
| 15 | 1600 | 0.001 | 24 |
| 16 | 1500 | 0.001 | 24 |
| 17 | 1411 | 0.001 | 24 |
| 18 | 1333 | 0.001 | 24 |
| 19 | 1263 | 0.001 | 24 |
| 20 | 1200 | 0.001 | 24 |
| ... | | | |
| 30 | 533 | 0.001 | 16 |

Or, if the total number of deliveries is n, the cost Cki for the ith delivery of k seconds, with the median of seconds per click at a, will be:

$$Cki = Ck(i-1) + Ck(i-1)/n \, (-2\sigma < k < +2\sigma)$$

$$Cki = Ck(i-1) - Ck(i-1)/n \, (k < -2\sigma \text{ or } k > +2\sigma)$$

Bidding Based on CPM

When the advertiser is bidding by CPM, the system disclosed herein converts this bid into CPS. In conventional systems, if an advertiser bids by CPM, the price per 1000 page views was constant regardless of the number of clicks. In the system devised by this invention, advertisement slots are not sold by page views (PVs), so 1PV is converted into 1AV (ad view), and the amount to be charged will also be converted into CPS. For such bids, even if the CPM bid is the same, the CPS price may change according to the length of the ad. An interface in which the user enters the CPM cost, and then enters the number of seconds to deliver ads for each AV is entered would be expected, which will return in a real-time basis the number of AVs that this bid would amount to. Through such interface, advertisers can use the CPS logic and deliver ads accordingly while using a familiar eCPM-type method. An exemplary conversion formula comparing eCPM and eCPS was discussed above in, for example, equations (1) and (5).

Bidding Based on Both CPS and CPM

Advertisers may also bid using a combination of CPC and CPS. CPC is a way by which publishers guaranteed to the advertisers the effect (e.g. click) of their ad, and on the other hand, CPS is a way by which advertisers guarantee a certain amount of payment to the publisher, by, for example, limiting the CPC bid to 50% of the market "CPC-only" value, the "guarantee" can be shared equally between the media and the advertiser.

Computing Advertising Indices

The index for the conventional method of advertisement in which the effective price of 1000 impressions is eCPM, and the indices devised by techniques introduced herein (e.g., in which CPS and CPC are designated in combination) for branding and direct response are "Branding plus Direct Response CPS (bdCPS)" and "Branding Plus Direct Response CPC (bdCPC)", Non-limiting examples of computing various advertising indices, as contemplated by the CPS methodologies introduced herein, are now presented.

The unit of advertisement is the general term "Advertisement", or its shortened form, "Ad(s)".

If the Ad is displayed even for an instant, that display is considered an "Ad View (AV)", and corresponds to the index "Page View (PV)" for the displaying of websites, etc. For example, if an advertisement is shown 1000 times, that would be counted as 1000 Ad Views (AVs).

Next, the inherent length of a specific advertisement (i.e. the length of an advertisement movie) is referred to as the "Ad Length (AL)". If the advertiser submits an advertisement video that has a length of 15 seconds, the AL is 15 seconds regardless of the users' actions or display times.

The specific time that an ad has been shown on the screen is referred to as the "Ad View Length (AVL)". If a user jumps to a different website after 8 seconds of a 15-second ad has been shown, the AL is 15 seconds, but the AVL is 8 seconds.

When an ad or multiple ads have been shown for a certain number of times, the average of the AVLs is referred to as the "Average Ad View Length (AAVL)."

The click rate for a certain number of AVs shall be referred to as the "Ad View Click Rate (AVCR)".

By calculating the cost necessary for an ad to be clicked once by the user, in the case of bdCPC×bdCPS, the cost when bCPS is used can be deducted and a recommendation may be made for bCPS.

The cost between clicks is bdCPS×SPC+bdCPC, and therefore bCPS must be the cost between clicks/SPC.

$$bdCPS \times SPC + bdCPC/SPC = bCPS \times SPC \quad (7)$$

Average Ad Length (AAL) is:

$$AAL = \frac{\Sigma_n AAVLn}{n} \quad (8)$$

In embodiments, We can assume that PV and AV have equivalent values. The conventional system using eCPM sells all PVs over, for example, 3 seconds long at the same price, regardless of the length of the video. This is one of the fundamental flaws of CPM.

The relationship between AV and PV are as shown below:

$$AV = PV \times APVL \times 1000 \times \frac{n}{\Sigma_n AAVLn} \quad (9)$$

Here, the relationship between CTR in conventional eCPM systems and AVCR in the system as contemplated herein is defined, and this is used to calculate the number of clicks in 1000 PVs and the clicking cost for 1000 PVs.

$CTR$=the number of clicks/$PV$ $AVCR$=the number of clicks/$AV$

In conventional eCPM systems, the clicking cost of 1000 $PV$=1000×CTR×CPC. On the other hand, in the eCPS system using bdCPC×bdCPS, the following relationships are true:

the number of clicks in 1000 $PV$=1000×($AV/PV$)× $AVCR$ the clicking cost for 1000 $PVs$=1000×($AV/PV$)× $AVCR$×$bCPC$+$bdCPS$×$SPC$×1000×($AV/PV$)× $AVCR$ Thus, $$\text{the number of clicks in } 1000 \ PV = \quad (11)$$
$$1000 \times CTR \times CPC \times 10^3 \times APVL \times 10^3 \times \frac{n}{\Sigma_n AAVL_n} \times AVCR \times$$
$$bCPC + bdCPS \times SPC \times 10^3 \times APVL \times 10^3 \times \frac{n}{\Sigma_n AAVL_n} \times AVCR$$

Now, bCPS in eCPS can be represented by the clicking cost in 1000 PVs, and a connection can be made with bdCPS× bdCPC in eCPS.

$AVCR$=the number of clicks/$AV$

Seconds for 1000$PVs$=$PAVL$×1000 clicking cost for 1000$PVs$=1000×($AV/PV$)×$AVCR$× $bCPC$+$bdCPS$×$SPC$×100×($AV/PV$)×$AVCR$ Then, the clicking cost for, 1000 $PVs$/seconds for 1000$PV$=recommended $bCPS$ This means that:

$$bCPS = 10^3 \times \frac{n}{\Sigma_n AAVL_n} \times \frac{\text{clicks}}{AV} \times bCPC + \quad (12)$$
$$bdCPS \times SPC \times 10^3 \times \frac{n}{\Sigma_n AAVL_n} \times \frac{\text{clicks}}{AV}$$

Thus:

$$bCPS = \frac{bdCPS \times \text{clicks} + bdCPS \times SPC \times \text{clicks}}{PV \times APVL} \quad (13)$$

$$bCPS = \frac{bdCPS + bdCPS \times SPC}{APVL} \times CTR$$

This makes a connection between bCPS and bdCPS×bdCPC in eCPS. cCPS indicators may also be computed as:

$$eCPS=(bdCPC+bdCPS \times SPC) \times CTR \times 1000 \qquad (14)$$

In embodiments, eCPS is the eCPM that can be expected for the publisher in the system that is devised using the techniques introduced herein, and if this value is larger than the eCPM value for conventional technology, it can be expected that the publisher/media will yield a higher revenue. This would allow for market value lost by conventional technology to be rediscovered, the underrated value to be evaluated appropriately, and the entire market to be revitalized.

Determining Order of Priority for Advertisements

Based on the above-discussed ability to obtain eCPS value, the "order of priority for advertisements" can be determined. Here, the expected CTR or the SPC, cCPS, interest matching score, the quality of ad creativeness or the quality of the ad landing page, etc. are indices that are the basis when determining the "quality of the advertisement", and the "order of priority which takes the quality of advertisements into considerations", can be calculated, for example, as below:

$$S(u, k) = \sum_n C_n(u, k) W_n(u, k) \qquad (15)$$

Here, S is the total quality score, u is the advertiser, k is the keyword that is the target of the advertisement, Cn is a set of elements that compose the quality and Wn is the weighted value for each of these elements. The above equation is merely an example and the formula for calculated the quality of advertisements need not be limited to the above equation.

Further, the quality of advertisements in the device devised by this invention need not be based on the Seconds per Click (SPC) index, but for example on the Ad View Click Rate (AVCR). When this is the case, $$AVCR = \text{Number of Clicks/Number of Effective Distributions of the Advertisement}$$

In embodiments, the systems described herein may be equipped with a mechanism to match keywords that are set for advertisements to become targets for distribution and keywords or the equivalents thereof that users have entered into a webpage or keywords that have been extracted from web pages viewed by the user. The mechanism to calculate the fit of these keywords can be as explained below.

The goodness of fit for a pair of arbitrary keywords k1 and k2 can appropriately be calculated by the semantic similarity of the pair. For an area such as web advertisements in which new topics are continuously born and these newly born topics can be of high importance, it is essential to deal with unknown keywords. Therefore, Sh (k1, K2)=[Distance within the class] if the keyword pair is known and the existing class relations can be used semantically. If this is not the case, the distance Sq (k1, K2) in a keyword graph dynamically composed from the Co-occurrence frequency can be used. The total goodness of match can be calculated with a weighted sum S(k1,k2)=h Sh(k1,k2)+g Sg(k1,k2). Here, for an unknown keyword, the most similar known keyword S (k1, K2) can be obtained and used as the alternative keyword by calculating the distance between character strings Further, when using advertisements of variable lengths such as those devised by the techniques described herein, the switching of advertisements are based not on page transition but on time, and additionally, they can switch upon page transition as shown in FIG. 5. In the case where switching occurs upon page transition, because it would be assumed that a new series of advertisement display occurs upon switching pages, the possibility that the same advertisement will be shown more than once to the same user will become higher. On the other hand, if advertisements are distributed by the device devised by this invention rather than based on page transition, if it is assumed that the same series of advertisement display is continuing, a single series of advertisement display becomes longer, and the possibility that the same advertisement will be shown more than once will decrease, but the possibility that a low-priority advertisement is shown will become higher.

Here, several indices can be used to determine the order of priority in displaying advertisements. Some examples of events or matters that may be the basis of these indices are as illustrated in the chart below.

| Elements for determining the order of priority for displaying advertisements | |
|---|---|
| Obtained from the DSP | Target for displaying the advertisement (keywords, attribution, etc) |
| | Bidding prices (CPC, CPS) |
| | Length of the Advertisement (AD Length AL) |
| | Size of the Advertisement |
| Obtained from the SSP | Length of time that the ad was actually displayed (Ad View Length AVL) |
| | (Click Through Rate, CTR) |
| | the time necessary for a click to occur (Seconds per Click, SPC) |
| | the total number of seconds until a conversion is reached (Seconds Per Action, SPA) |
| | Attribution of contents and users |
| Obtained by the device | The goodness of fit for the attribution of the contents on which and users to which the advertisement is show, and the keywords and attributions that advertisements targets for display |
| | Quality of the pages to which jumps are made upon clicking advertisements |
| devised by this invention | Goodness of fit between the advertisement and the keywords that the advertisement targets for display |

With these events and matters considered, indices to determine the order of priority to display advertisements can be devised as below, and by determining the order of priority to display advertisements based on these indices, the value of displaying advertisements can be increased Examples of Methods to Determine Order of Priority of Advertisement Display Indices to determine the order of priority to display advertisements can be devised as illustrated using illustrative examples below. By determining the order of priority to display advertisements based on these indices, the value of displaying advertisements may be increased, allowing for a more competitive and efficient advertising paradigm.

For a page p that the user u is viewing, a calculation of the weighted order of priority of display for advertisement group aj may need to be computed. In other words, the function w ($a_j$, u (p)), which calculates the weight, will express the algorithm for the entire calculation. Here, u (p) expresses the profile of user u when page p is viewed, including the viewing history.

When calculating using the degree of similarity between keywords, calculations are executed by expressing each user profile and advertisement as a set of attributed keywords Ku and Ka. In other words, w($a_j$, u(p))=w($Ka_j$,Ku). The degree of similarity between an arbitrary keyword pair of k1 and k2 can be calculated by the method abovementioned. Using this, the order of priority for displaying the advertisement can be obtained by sorting for $$w(a_i, u(p)) = \sum_{m,n} c_m c_n s(k_m, k_n) \quad (16)$$

Here, $c_m$ is the coefficient is based on the attribute type of the keyword, and by adjusting this coefficient, the attribute value of both the DSP and the SSP may be determined.

Gross Rating Point (GRP) for Comparing Ad Effectiveness in Different Media

Another aspect of the technology introduced herein is an ability to identify and appreciate the efficacy of an ad campaign, especially when the same advertisements are offered through different media. As an example, consider a comparison of a branding-type ad shown as a regular TV advertisement and when shown in web media in conjunction with the CPS-based technology disclosed herein. Of course, it is understood that such comparison may extend to other types of advertisements (e.g., search based advertisements) and comparisons may be between or among various different types of media. However, for the sake of simplicity, we use the example illustrated in FIGS. 6A-6B.

Figure 6A:
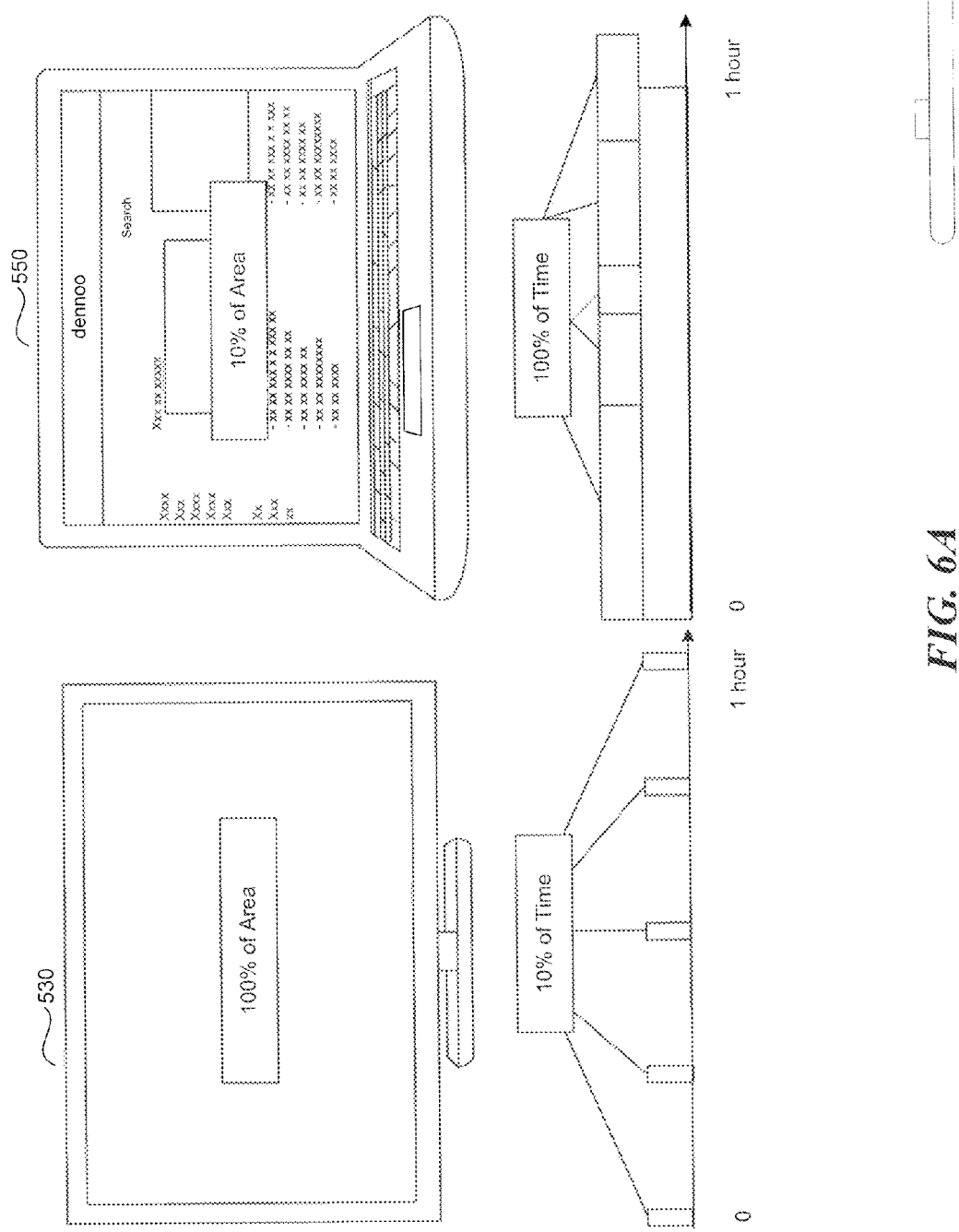
Figure 8:
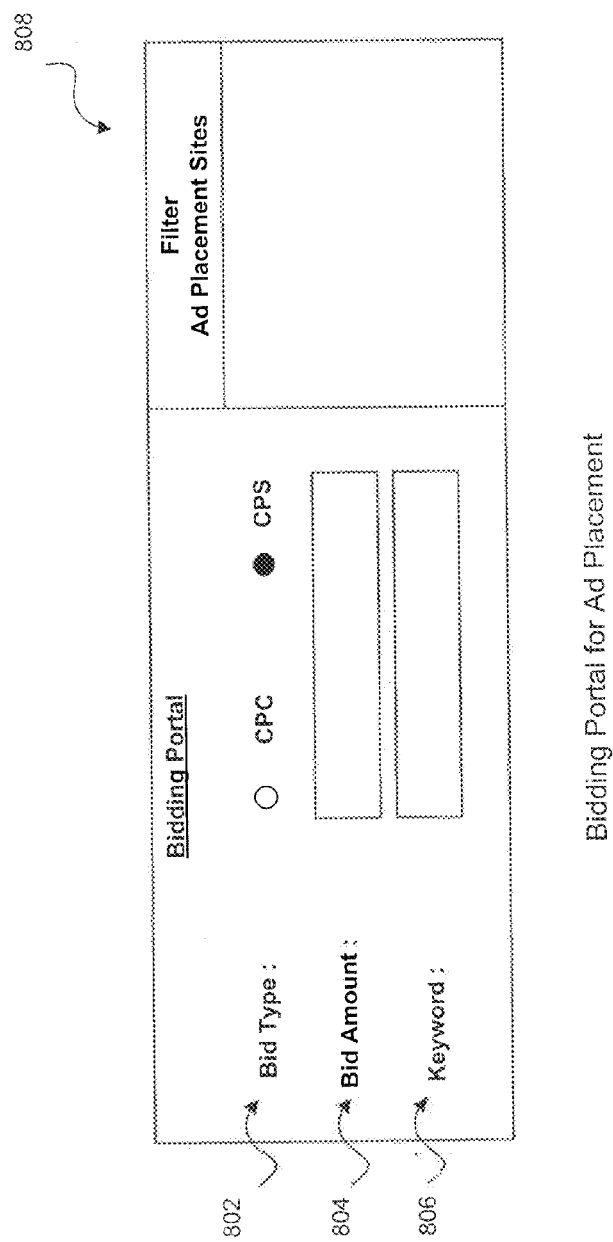
Figure 9:
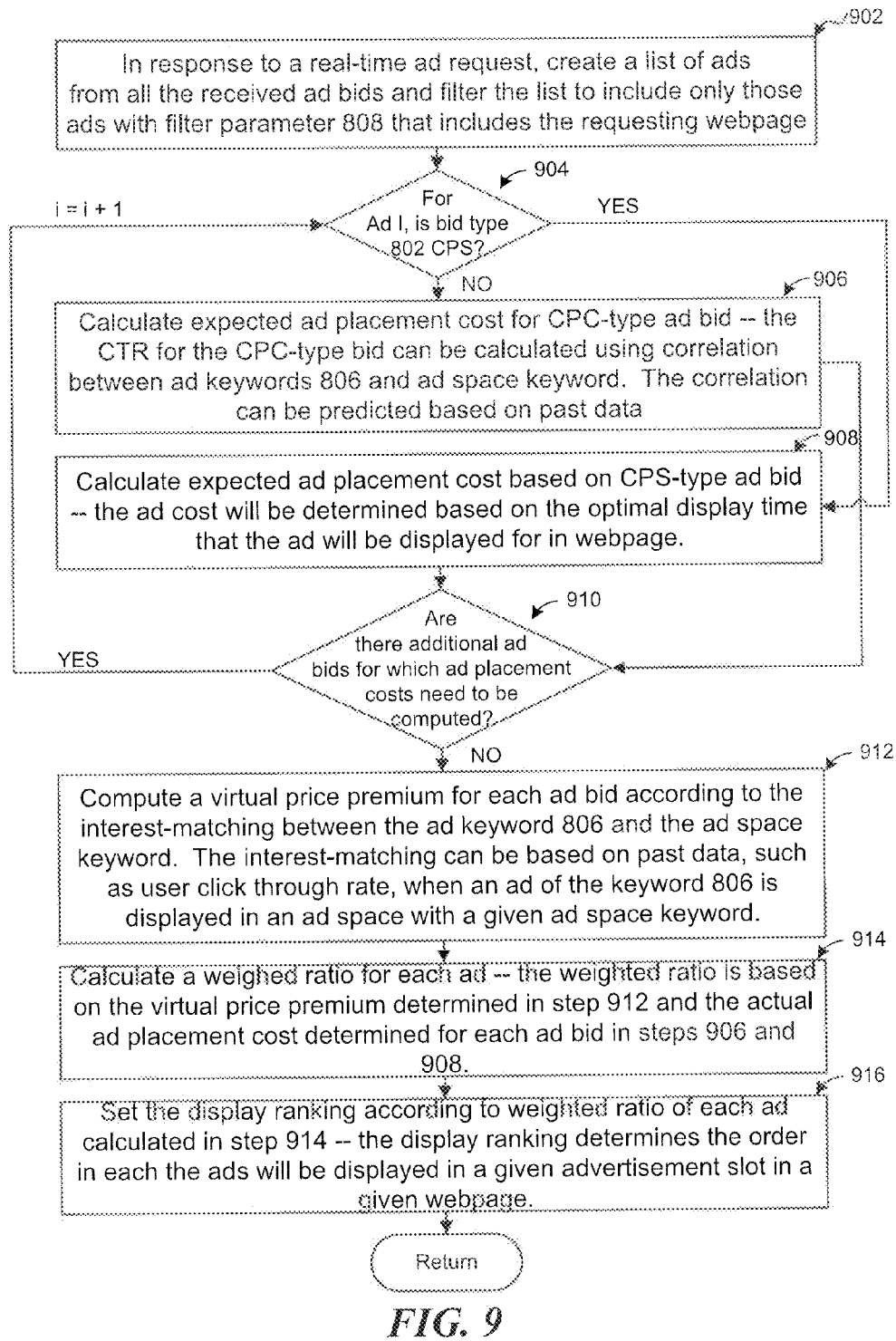
Figure 10A:
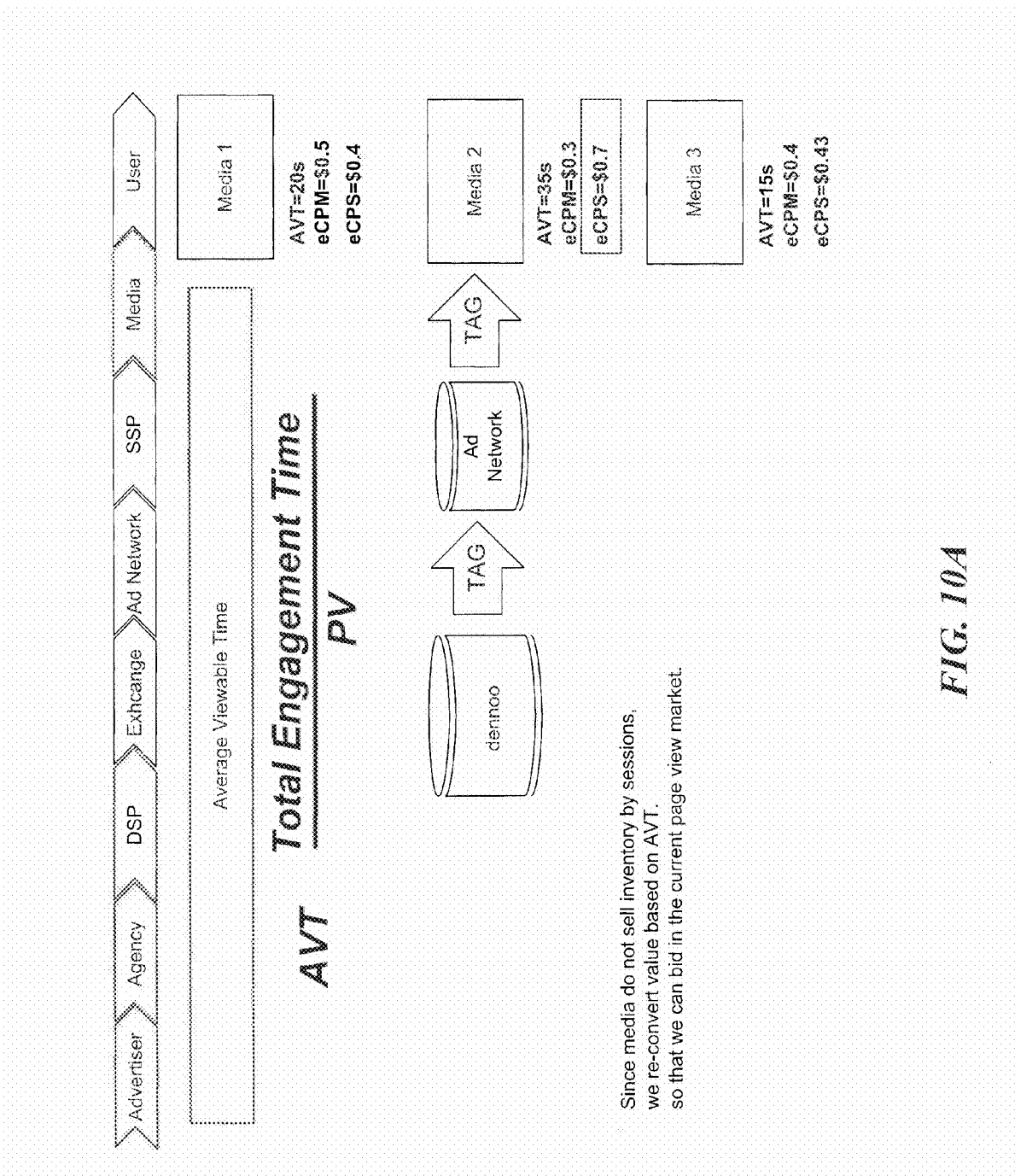
Figure 10B:
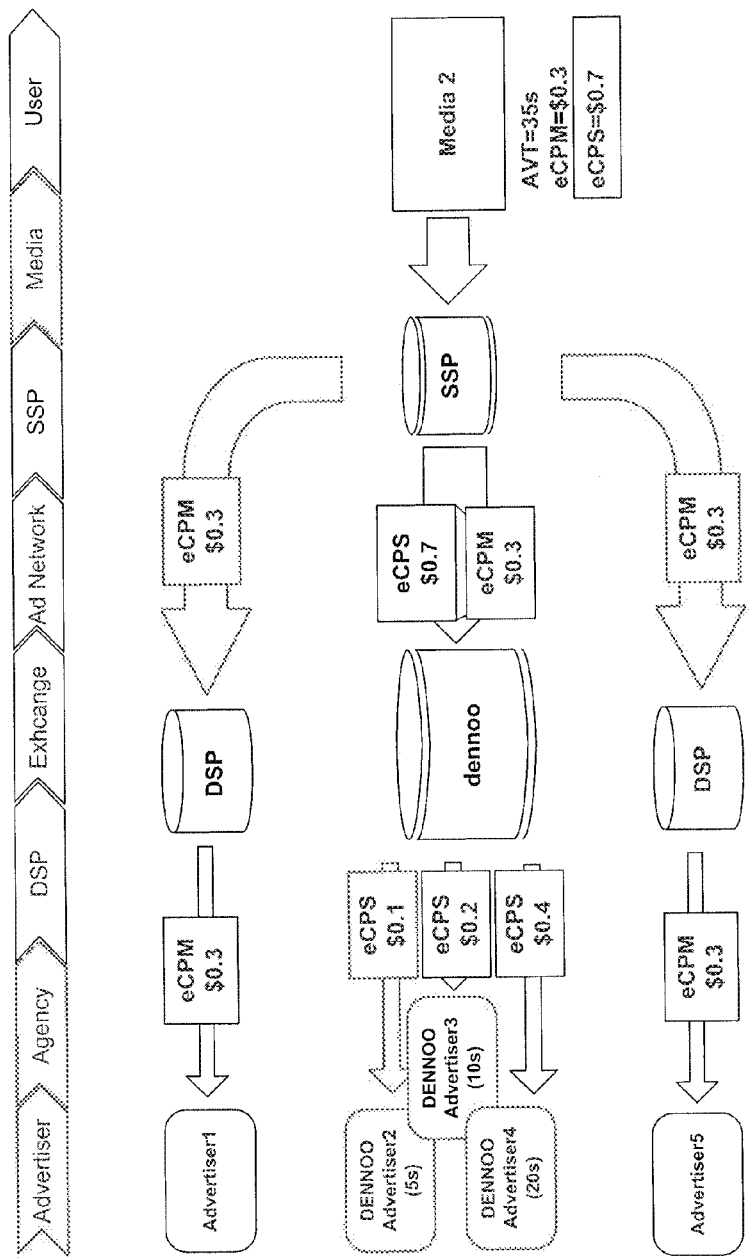
Figure 10C:
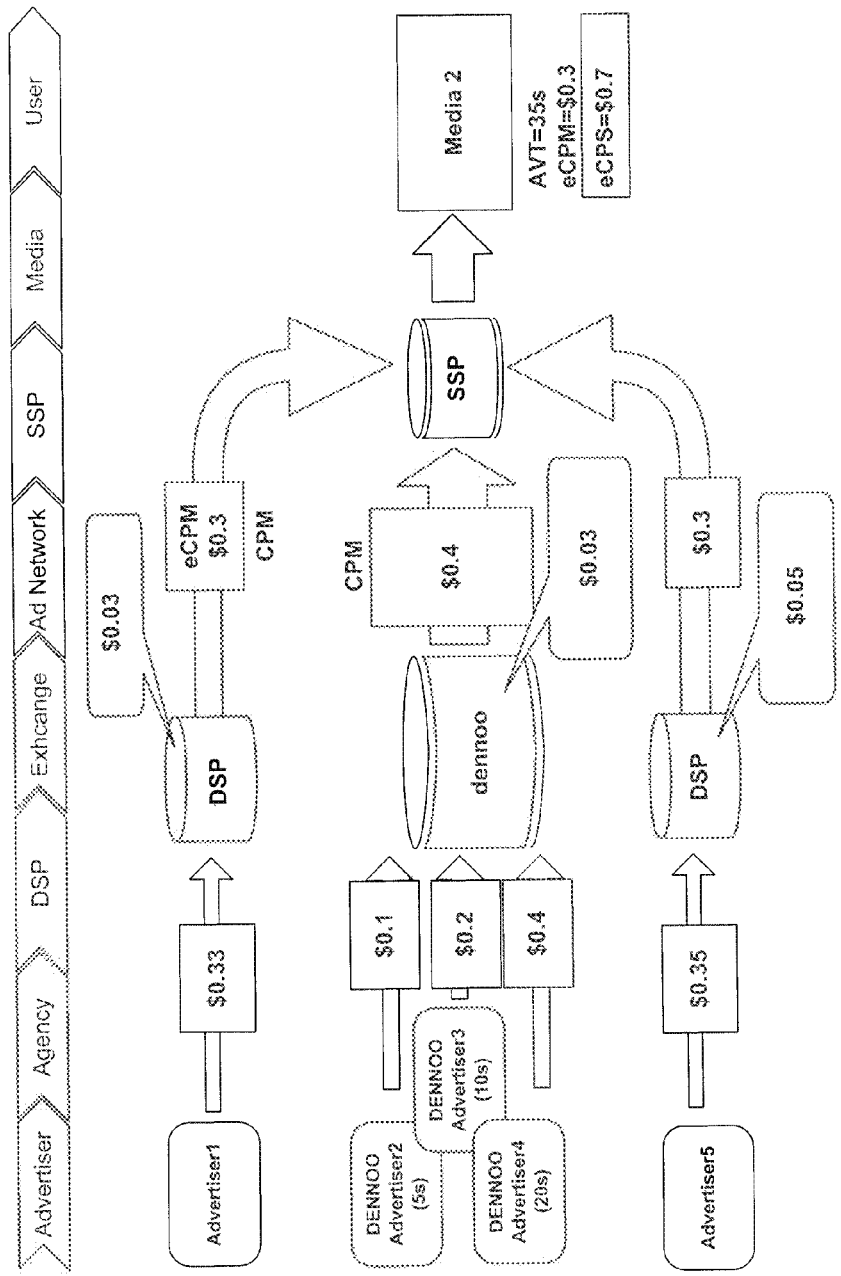
Figure 11A:
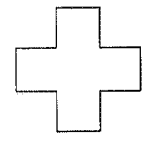
Figure 11B:
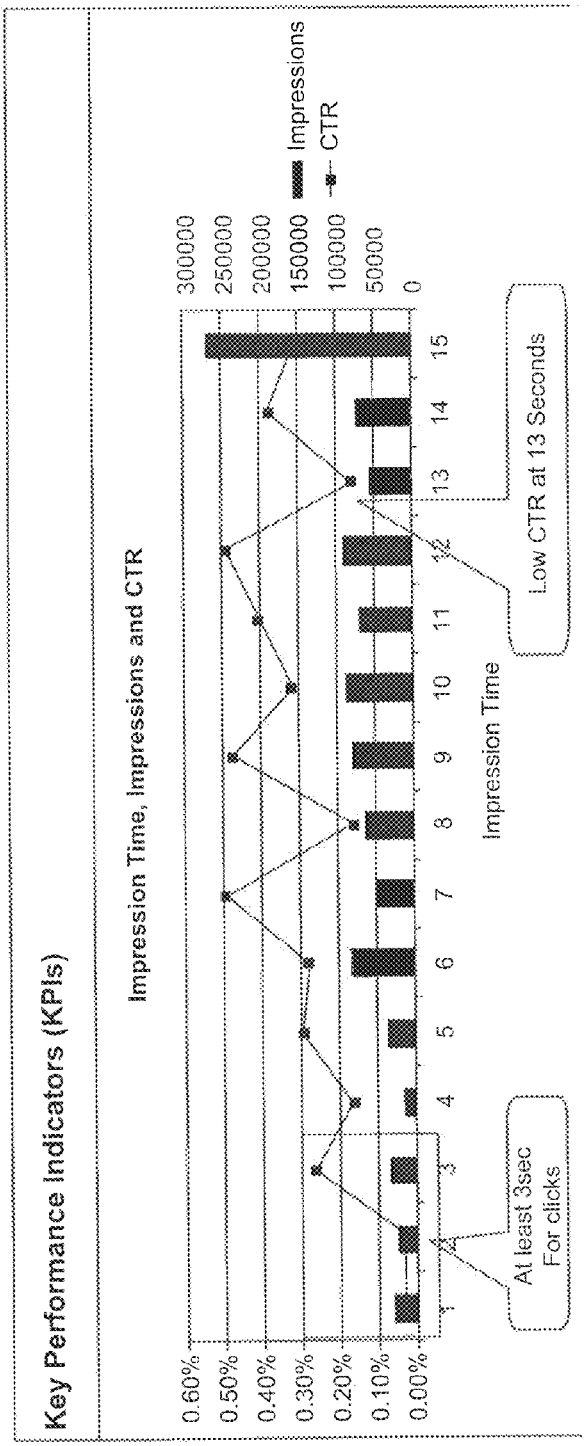
Figure 11C:
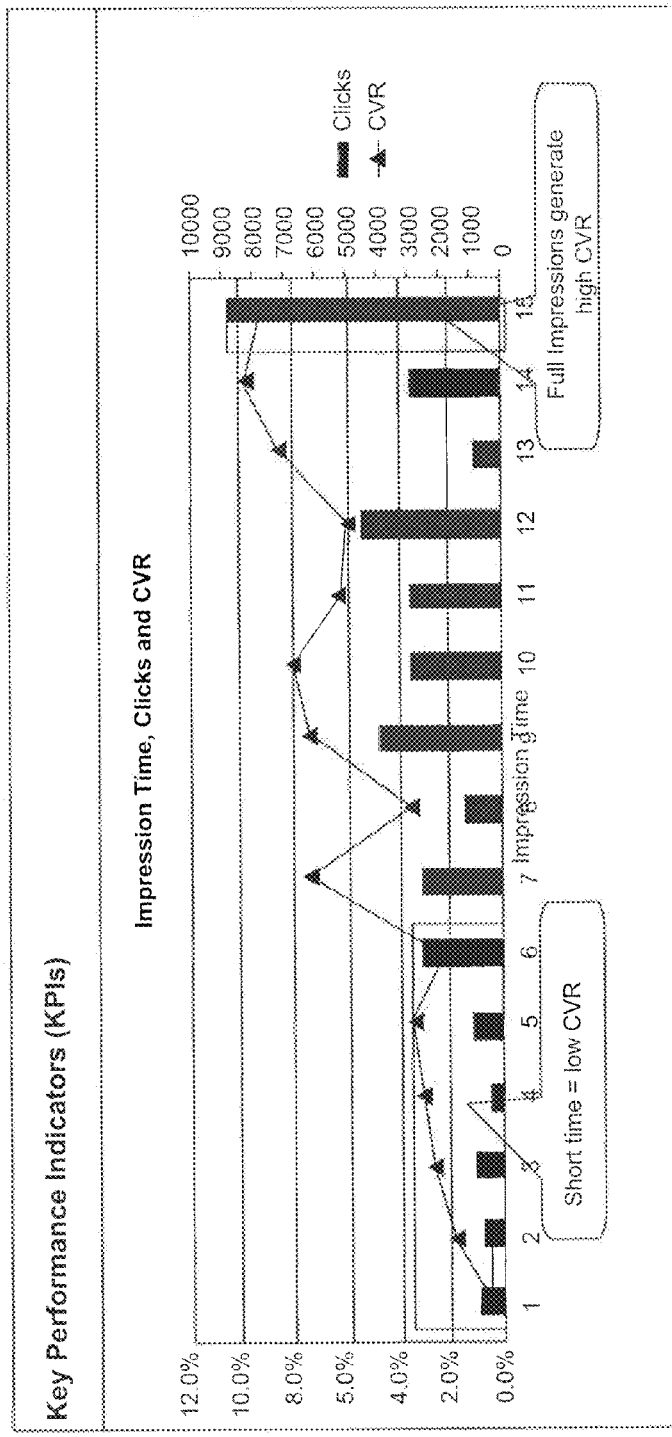

Here, as illustrated in FIG. 6A, the same advertisement is displayed using a TV 530 and also using a CPS-backed ad campaign. In the case of the TV advertisement 530, the ad clip is shown, for example, every 10 minutes during an hour for 20 seconds each time. However, the area covered by the advertisement is 100% (meaning it occupies the full screen). In the case of a branding e-commerce campaign 550, the advertisement is shown only at 10% of the area of the screen, but is shown continuously for the entire hour (assuming in this example that this is the only advertiser and has bid in a CPS manner for advertising through the entire page session). Here, the ad impression, i.e., the effective impression of the ad can be computed as the area multiplied by time of display of the ad. In this example, the effective impression for the two types of media is roughly the same—with the TV campaign showing the ad in a larger area, but in overall shorter duration, and the Internet campaign showing the ad in a smaller area, but in overall longer duration. Accordingly, given the approximately equal impression values, one would expect cost of advertising to be the same. However, that is not the case, and cost of advertising in a relative sense needs to be determined.

Since it is difficult to compare directly the cost of the campaigns, a Gross Rating Point (GRP) manner of comparison is introduced. Here, GRP is defined as the product of the percentage of target audience reached by an ad (percentage of population that saw the ad) and the ad frequency in the campaign. Accordingly, in the above example, as illustrated in FIG. 6B, if a 15 s ad was shown three times during a 10% reach show, and a particular demographic has 5.35 million households, where the cost per GRP in the TV campaign is $1000. As can be seen, the total cost using the GRP technique for the TV campaign is at $30,000. On the other hand, in the internet based campaign, the CPS bid by the advertiser is effectively 0.0002 cents per second. Using similar conditions, the cost is $700 for the above example. That is, for similar ad impressions, the CPS-backed Internet campaign is substantially less expensive relative to the TV counterpart. This computation and comparison has two benefits: it allows an advertiser to readily perceive the difference in cost of campaigning in different media to obtain similar ad impressions; and it also allows an advertiser to readily appreciate the advantage of using CPS-backed technology to achieve similar efficacy while reducing cost of advertising.

Examples of Practical Applicability of the CPS-Based Advertising Paradigm

A practical result of the technology introduced herein is an increase in efficiency and relevance (from the user's side) that an advertisement shown is relevant and matches the user's interest. On the publisher/media's side, the loss or waste in advertisement space is substantially mitigated. On the advertisers' side, by displaying advertisements only for a necessary and sufficient length of time and by being charged accordingly, the cost for a certain branding effort can be measured with higher accuracy and can also be implemented more efficiently. Additionally, in embodiments, the implementation of a unique bidding and sales technique that combines branding advertisement and direct response advertisements, results in at least the following perceivable advantages: (1) the set of options for advertisement sales will increase; (2) sales schemes and strategies will diversify and become increasingly specific; and (3) as a result, an expansion of the entire market can be expected.

In online advertisement, due to the legacy that search advertisement was the first major success, direct response advertisements, usually traded using Cost per Click (CPC) and Cost per Action (CPA), have been the mainstream. However, in the internet market as of today, the internet has become a "media" with the introduction of social media, etc., along with conventional search engines (CPC advertisement) and e-commerce engines (CPA advertisement), and the average page view length or session length is becoming significantly longer. Cost per Mille (CPM) is used often in conventional internet advertisement as the billing method for branding advertisements, and the recommended/suggested bidding price is often calculated using eCPM (CPC×CTR× 1000), but if advertisements are supposed to be sold for branding purposes, there would be no logical foundation in using eCPM. One of the reasons for the lack of such a logical foundation is that with eCPM, the CTR (which is an index that is relevant for direct response advertisements) is the decisive factor in determining the price. CPS, on the other hand, offers methods and systems of selling the length of time that an advertisement is displayed on the user's screen, which is independent of CTR and other direct response advertisement-related indices, making CPS a much fairer and efficient scheme of selling advertisements. CPS causes internet or e-commerce advertising measurable and accountable in a manner similar to how audience ratings and CPM cater to television broadcasting.

In the exemplary illustrations outlined above, a method and system was identified for comparing "eCPS" in relation to "eCPM." The technology disclosed herein allows for indices such as the total viewing time on the publisher side, number of views of an ad (AV), average number of seconds that an ad has been seen (AAVL), etc., to be measured and calculated. Such measurement is not possible in conventional online advertisements. These indices further offer a mechanism to calculate the suggested value of eCPM and compare with the suggested value against other advertising schemes (i.e., when eCPM is replaced with, for example, CPS (for branding) or CPS×CPC (for branding and direct response)).

"eCPS" expresses the suggested price for bCPS (branding CPS) alone as well as "bdCPS×bdCPC" (branding and direct response). Therefore, as discussed in the various scenarios above, the conventional value of (eCPM) is comparable with the various values or schemes identified herein (eCPS bCPS bdCPS×bdCPC). eCPS, is an index that has its primary focus on branding, as compared to conventional eCPM which primarily focuses on direct response. eCPM is also affected by other indices such as CTR and CPC that are directly associated with direct response advertisements, and eCPS allows for such influences to be ignored.

A key feature of the technology introduced herein is that "high quality media with higher levels of user engagement", which had been seriously undervalued due to the conventional eCPM valuation, will be able to sell their advertisement space based on the actual time that advertisements have been displayed on users' screens. Additionally, the technology enables value to be revived and allows these "high quality media" to receive advertisement fees commensurate with their "high quality" contents. On media that have "high quality" content, the users stay at pages longer, have longer sessions, and will not readily depart or jump away from pages. As a result, CTR is lower, and when calculations of advertisement value are conducted using eCPM, the price for advertisement on this media turns out to be lower than "low quality" media such as a website that is packed with links (thus having higher CTR). However, as disclosed herein with reference to the CPS-based technology, such discrepancy is resolved by valuing high quality media for the high quality of their contents. The technology thus allows higher quality contents and advertisements to be published, imparting benefits to the entire advertising ecosystem—the publisher, the advertiser, and the user.

FIG. 7 is a high-level block diagram showing an example of the architecture for a computer system 600 that can be utilized to implement, for example, a platform server (e.g., 114 from FIG. 1), a web server (e.g., 125 from FIG. 1), or any other computing device identified in the above disclosure. In FIG. 6, the computer system 600 includes one or more processors 605 and memory 610 connected via an interconnect 625. The interconnect 625 is an abstraction that represents any one or more separate physical buses, point to point connections, or both connected by appropriate bridges, adapters, or controllers. The interconnect 625, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus, sometimes referred to as "Firewire."

The processor(s) 605 may include central processing units (CPUs) to control the overall operation of, for example, the host computer. In certain embodiments, the processor(s) 605 accomplish this by executing software or firmware stored in memory 610. The processor(s) 605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 610 is or includes the main memory of the computer system 1100. The memory 610 represents any form of random access memory (RAM), read-only memory (ROM), flash memory (as discussed above), or the like, or a combination of such devices. In use, the memory 610 may contain, among other things, a set of machine instructions which, when executed by processor 605, causes the processor 605 to perform operations to implement embodiments of the present invention.

Also connected to the processor(s) 605 through the interconnect 625 is a network adapter 615. The network adapter 615 provides the computer system 600 with the ability to communicate with remote devices, such as the storage clients, and/or other storage servers, and may be, for example, an Ethernet adapter or Fiber Channel adapter.

Unless the context clearly requires otherwise, throughout the description and the claims, the words "comprise,". "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or sub-combinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶ 6 will begin with the words "means for.") Accordingly, the applicant reserves the right to add additional claims after filing the application to pursue such additional claim forms for other aspects of the invention.

What is claimed is:

1. A method by a platform server having a processor for processing and displaying a plurality of advertisements, the method comprising:
   receiving in the platform server a plurality of advertisements from one or more advertisers intended for display within an advertising section of a plurality of webpages during a session for a duration specified by the advertiser, wherein the session includes one or more page transitions among the plurality of webpages and each transition results in a different one of the plurality of webpages being the actively viewed webpage;
   scheduling by the platform server the received plurality of advertisements for display within the advertising section of a particular webpage of the plurality of webpages by determining at least a position, length, and repetition of each advertisement within the advertising section of the particular webpage;
   transmitting from the platform server to a user's computing device the scheduled advertisements to cause the display of the plurality of advertisements on the user's computing device to switch within a session based on the duration of the advertisements independently of page transitions among the plurality of webpages; and
   computing, by the platform server, a cost incurred by each of the one or more advertisers for display of the plurality of advertisements, the cost computed as a function of a cost-per-second (CPS) model of displaying the advertisement within the session, the cost-per-second model indicative of total duration of display of corresponding one or more advertisements within the session.

2. The method of claim 1, wherein the CPS model further includes a computation of a cost-per-click (CPC) ensuing from the display of the advertisement in determining the cost incurred by a corresponding advertiser.

3. The method of claim 1, further comprising: receiving, from the one or more advertisers, a bid to place the advertisement in the advertising section, the bid received as a function of a CPS rate for placing the advertisement, wherein the bid includes at least a CPS price offered by the one or more advertisers for placement of respective advertisements in the advertising section.

4. The method of claim 3, further comprising:
   receiving a plurality of bids for display of different advertisements in a first advertising section, each of the bids including at least a CPS bid price, wherein each of the plurality of bids includes at least a CPS bidding price for display of respective advertisements, and optionally, one or more of enhanced bidding options, the enhanced bidding options including an additional cost-per-click (CPC) bidding price, priority indication, duration of the advertisement, periodicity of the advertisement, indication of an overall number of displays, duration of the day for playing the advertisement, or indication of associated keywords, wherein the method further comprises charging respective advertisers additional cost for selection of one or more of the enhanced bidding options.

5. The method of claim 4, further comprising:
   monitoring indices associated with one or more of the enhanced bidding options as applicable to placement of a given advertisement in a given webpage;
   updating index values based on present conditions; and
   providing input on index values to clients to enable clients to choose values for one or more of the enhanced bidding options reflective of the present conditions to increase ROI for the clients.

6. The method of claim 4, further comprising:
   providing an option to allow the advertisers to submit one or more bids using a non-CPS bidding price model;
   internally converting the non-CPS bid price of the non-CPS bidding price model to an equivalent CPS value to enable computation of cost of displaying corresponding advertisements; and
   displaying advertisements according to a CPS equivalent billing model.

7. The method of claim 6, wherein the non-CPS bidding price model includes one or more of: a cost-per-click (CPC) billing model; a cost-per-mille (CPM) billing model; or an effective CPM (eCPM) billing model.

8. The method of claim 6, wherein when a given bid is received according to an eCPM billing model, the given bid is internally converted to an equivalent effective CPS (eCPS) value, the conversion computed as a function of the eCPM bid value, an effective impression value, and a total number of page views value associated with the one or more webpages on which the advertisement is to be published, wherein the effective impression value is a function of an effective average page view length and sum of all ad view lengths associated with the advertisement in relation to the one or more webpages.

9. The method of claim 3, further comprising:
   receiving the bid as a function of a combination of CPS and cost-per-click (CPC) billing models.

10. The method of claim 8, wherein the combination is a product of CPS and CPC billing models.

11. The method of claim 1, further comprising:
   controlling display of each of the plurality of advertisements based on a previously specified criterion for effective display of each advertisement on the one or more webpages, wherein the specified criterion is a function of an overall area of an observable screen of the media displaying the advertisement at any given time;
   playing the advertisement when the specified criterion is matched in the one or more webpages;
   stopping display of advertisement and tolling of advertisement for billing purposes when effective display does not match the specified criterion; and
   billing advertiser for display of advertisement based on the actual display time of the advertisement in the one or more webpages, the actual display time indicative of a duration during which display of the advertisement matched the specified criterion.

12. The method of claim 1, wherein the plurality of advertisements are placed in a given webpage displaying search results of a search query previously input by a user.

13. The method of claim 11, wherein each of the plurality of advertisements is embedded within non-advertisement content of the one or more webpage.

14. The method of claim 1, wherein the plurality of advertisements are displayed to a user through a personal computing terminal.

15. The method of claim 1, wherein the plurality of advertisements are displayed to a plurality of users through an electronic billboard device.

16. The method of claim 1, further comprising:
offering a computation model for computing effective cost of displaying advertisements in two different types of media, offering the computation model comprising:
computing an equivalent ad impression between the two types of media targeted for displaying an advertisement, a first of the two types of media configured for displaying advertisements adapted for a CPS-based model, and a second of the two types of media configured for displaying advertisements adapted for a non-CPS-based model;
computing an effective equivalent ad impression of displaying advertisements in the two types of media, the effective equivalent ad equivalent ad impression computed by identifying an equivalent value of a product of area of display of the advertisement in the respective media and a total duration of time of display of the advertisement in the respective media;
computing a gross rating point (GRP) for the two types of media, the gross rating point (GRP) computed as a product of a percentage of target audience reached by a given advertisement and the frequency of a campaign associated with the campaign; and
computing actual cost per GRP of advertising in relation to the effective equivalent ad impression for the two types of media.

17. A platform server for processing and displaying a plurality of advertisements, the system comprising:
a processor;
a memory configured to store a set of instructions, which when executed by the processor cause the server to perform a method, the method including:
receiving a plurality of advertisements from one or more advertisers intended for display within an advertising section of a plurality of webpages during a session for a duration specified by the advertiser, wherein the session includes one or more page transitions among the plurality of webpages and each transition results in a different one of the plurality of webpages being the actively viewed webpage;
scheduling the received plurality of advertisements for display within the advertising section of a particular webpage of the plurality of webpages by determining at least a position, length, and repetition of each advertisement within the advertising section of the particular webpage;
transmitting to a user's computing device the scheduled advertisements to cause the display of the plurality of advertisements on the user's computing device to switch within a session based on the duration of the advertisements independent independently of page transitions among the plurality of webpages; and
computing a cost incurred by each of the one or more advertisers for display of the plurality of advertisements, the cost computed as a function of a cost-per-second (CPS) model of displaying the advertisement within the session, the cost-per-second model indicative of total duration of display of corresponding one or more advertisements within the session.

18. The system of claim 17, wherein the CPS model further includes a computation of a cost-per-click (CPC) ensuing from the display of the advertisement in determining the cost incurred by a corresponding advertiser.

19. The system of claim 17, wherein the method further comprises:
receiving, from the one or more advertisers, a bid to place the advertisement in the advertising section, the bid received as a function of a CPS rate for placing the advertisement, wherein the bid includes at least a CPS price offered by the one or more advertisers for placement of respective advertisements in the advertising section.

20. The system of claim 19, the method further comprising:
receiving a plurality of bids for display of different advertisements in a first advertising section, each of the bids including at least a CPS bid price, wherein each of the plurality of bids includes at least a CPS bidding price for display of respective advertisements, and optionally, one or more of enhanced bidding options, the enhanced bidding options including an additional cost-per-click (CPC) bidding price, priority indication, duration of the advertisement, periodicity of the advertisement, indication of an overall number of displays, duration of the day for playing the advertisement, or indication of associated keywords, wherein the method further comprises charging respective advertisers additional cost for selection of one or more of the enhanced bidding options.

21. The system of claim 20, the method further comprising:
providing an option to allow the advertisers to submit one or more bids using a non-CPS bidding price model;
internally converting the non-CPS bid price of the non-CPS bidding price model to an equivalent CPS value to enable computation of cost of displaying corresponding advertisements; and
displaying advertisements according to a CPS equivalent billing model.

22. The system of claim 21, wherein the non-CPS bidding price model includes one or more of: a cost-per-click (CPC) billing model; a cost-per-mille (CPM) billing model; or an effective CPM (eCPM) billing model.

23. The system of claim 22, wherein when a given bid is received according to an eCPM billing model, the given bid is internally converted to an equivalent effective CPS (eCPS) value, the conversion computed as a function of the eCPM bid value, an effective impression value, and a total number of page views value associated with the one or more webpages on which the advertisement is to be published, wherein the effective impression value is a function of an effective average page view length and sum of all ad view lengths associated with the advertisement in relation to the one or more webpages.

24. The system of claim 19, wherein the method further comprises:
receiving the bid as a function of a combination of CPS and cost-per-click (CPC) billing models.

25. The system of claim 24, wherein the combination is a product of CPS and CPC billing models.

26. The system of claim 17, wherein the method further comprises:
controlling display of each of the plurality of advertisements based on a previously specified criterion for effective display of each advertisement on the one or more webpages, wherein the specified criterion is a function of an overall area of an observable screen of the media displaying the advertisement at any given time;
playing the advertisement when the specified criterion is matched in the one or more webpages;

stopping display of advertisement and tolling of advertisement for billing purposes when effective display does not match the specified criterion; and billing advertiser for display of advertisement based on the actual display time of the advertisement in the one or more webpages, the actual display time indicative of a duration during which display of the advertisement matched the specified criterion.

27. The system of claim 17, further comprising:

offering a computation model for computing effective cost of displaying advertisements in two different types of media, offering the computation model comprising:

computing an equivalent ad impression between the two types of media targeted for displaying an advertisement, a first of the two types of media configured for displaying advertisements adapted for a CPS-based model, and a second of the two types of media configured for displaying advertisements adapted for a non-CPS-based model;

computing an effective equivalent ad impression of displaying advertisements in the two types of media, the effective equivalent ad equivalent ad impression computed by identifying an equivalent value of a product of area of display of the advertisement in the respective media and a total duration of time of display of the advertisement in the respective media;

computing a gross rating point (GRP) for the two types of media, the gross rating point (GRP) computed as a product of a percentage of target audience reached by a given advertisement and the frequency of a campaign associated with the campaign; and computing actual cost per GRP of advertising in relation to the effective equivalent ad impression for the two types of media.

* * * * *

UNITED STATES PATENT AND TRADEMARK OFFICE
CERTIFICATE OF CORRECTION

PATENT NO.          : 8,694,373 B2                                Page 1 of 1
APPLICATION NO.     : 13/324325
DATED               : April 8, 2014
INVENTOR(S)         : Shigeto Umeda It is certified that error appears in the above-identified patent and that said Letters Patent is hereby corrected as shown below:

In the Specification:

Column 12, line 26, delete "Conevrted" and insert --Converted--

In the Claims:

Column 25, claim 17, line 57, delete "independent"

Signed and Sealed this
Fifteenth Day of July, 2014

Michelle K. Lee
*Deputy Director of the United States Patent and Trademark Office*